United States Patent
Walden

(10) Patent No.: US 11,507,973 B2
(45) Date of Patent: Nov. 22, 2022

(54) SYSTEM AND METHODS FOR DETERMINING LOCATION OF POP DISPLAYS WITH WIRELESS BEACONS USING MOBILE APPLICATIONS ON MOBILE DEVICES

(71) Applicant: ABL IP HOLDING, LLC, Atlanta, GA (US)

(72) Inventor: Charles Walden, Austin, TX (US)

(73) Assignee: ABL IP HOLDING, LLC, Atlanta, GA (US)

(*) Notice: Subject to any disclaimer, the term of this patent is extended or adjusted under 35 U.S.C. 154(b) by 0 days.

(21) Appl. No.: 17/376,848

(22) Filed: Jul. 15, 2021

(65) Prior Publication Data

US 2021/0342878 A1 Nov. 4, 2021

Related U.S. Application Data

(63) Continuation of application No. 15/248,057, filed on Aug. 26, 2016, now Pat. No. 11,074,606, which is a
(Continued)

(51) Int. Cl.
*G06Q 30/00* (2012.01)
*G06Q 30/02* (2012.01)
(Continued)

(52) U.S. Cl.
CPC ....... *G06Q 30/0241* (2013.01); *G06F 1/3212* (2013.01); *G06Q 30/0259* (2013.01);
(Continued)

(58) Field of Classification Search
CPC ........... G06Q 30/0241; G06Q 30/0259; G06Q 30/0261; G06Q 30/0267; G06Q 30/00;
(Continued)

(56) References Cited

U.S. PATENT DOCUMENTS

| 6,539,280 B1 | 3/2003 | Valiulis et al. |
| 6,571,279 B1 | 5/2003 | Herz et al. |

(Continued)

FOREIGN PATENT DOCUMENTS

| AU | 2002362010 A1 | 6/2003 |
| AU | 2004222294 A1 | 10/2004 |

(Continued)

OTHER PUBLICATIONS

Non Final Office Action for U.S. Appl. No. 15/248,057, dated Oct. 5, 2018, 16 pages.
(Continued)

*Primary Examiner* — Alvin L Brown
(74) *Attorney, Agent, or Firm* — RatnerPrestia

(57) ABSTRACT

Systems and methods for using wireless beacons in point of purchase ("POP") displays to facilitate the delivery of consumer oriented content to mobile devices is disclosed herein. Wireless beacons may be used to broadcast wireless signals from POP displays, where the wireless signals include data packets with unique identifiers for the wireless beacons. A wireless signal from a POP display may be received by a mobile device. The mobile device may provide the unique identifier in the wireless signal and a retail location of the mobile device to a remote server. The retail location of the mobile device may be provided by a mobile application (e.g., a retailer app) on the mobile device. The remote server may determine the retail location of the POP display by associating the retail location of the mobile device with the wireless beacon.

11 Claims, 16 Drawing Sheets

Related U.S. Application Data continuation of application No. 15/153,135, filed on May 12, 2016, now Pat. No. 11,080,744.

(60) Provisional application No. 62/291,828, filed on Feb. 5, 2016, provisional application No. 62/256,248, filed on Nov. 17, 2015, provisional application No. 62/160,949, filed on May 13, 2015.

(51) Int. Cl.

| | | |
|---|---|---|
| *H04W 4/029* | (2018.01) | |
| *H04W 4/50* | (2018.01) | |
| *H04W 4/80* | (2018.01) | |
| *H04W 76/40* | (2018.01) | |
| *H04L 67/568* | (2022.01) | |
| *H04W 40/24* | (2009.01) | |
| *H04W 64/00* | (2009.01) | |
| *H04W 4/06* | (2009.01) | |
| *H04W 72/08* | (2009.01) | |
| *H04W 4/02* | (2018.01) | |
| *G06F 1/3212* | (2019.01) | |
| *H04L 67/01* | (2022.01) | |
| *H04W 88/16* | (2009.01) | |
| *H04W 84/12* | (2009.01) | |

(52) U.S. Cl.
CPC ..... *G06Q 30/0261* (2013.01); *G06Q 30/0267* (2013.01); *H04L 67/568* (2022.05); *H04W 4/02* (2013.01); *H04W 4/023* (2013.01); *H04W 4/029* (2018.02); *H04W 4/06* (2013.01); *H04W 4/50* (2018.02); *H04W 4/80* (2018.02); *H04W 40/244* (2013.01); *H04W 64/00* (2013.01); *H04W 64/006* (2013.01); *H04W 72/085* (2013.01); *H04W 76/40* (2018.02); *G06Q 30/00* (2013.01); *G06Q 30/0207* (2013.01); *G06Q 30/0251* (2013.01); *G06Q 30/0268* (2013.01); *G06Q 30/0273* (2013.01); *H04L 67/01* (2022.05); *H04W 84/12* (2013.01); *H04W 88/16* (2013.01); *Y02D 30/70* (2020.08)

(58) Field of Classification Search
CPC .......... G06Q 30/0207; G06Q 30/0251; G06Q 30/0268; G06Q 30/0273; H04W 4/029; H04W 4/50; H04W 4/80; H04W 76/40; H04W 4/02; H04W 4/023; H04W 4/06; H04W 40/244; H04W 64/00; H04W 64/006; H04W 72/085; H04W 84/12; H04W 88/16; H04L 67/568; H04L 67/01; G06F 1/3212; Y02D 30/70
See application file for complete search history.

(56) References Cited

U.S. PATENT DOCUMENTS

| | | | |
|---|---|---|---|
| 6,837,427 B2 | 1/2005 | Overhultz et al. |
| 6,951,305 B2 | 10/2005 | Overhultz et al. |
| 7,021,535 B2 | 4/2006 | Overhultz et al. |
| 7,233,241 B2 | 6/2007 | Overhultz et al. |
| 7,310,070 B1 | 12/2007 | Hardman et al. |
| 7,374,096 B2 | 5/2008 | Overhultz et al. |
| 7,413,121 B2 | 8/2008 | Goel et al. |
| 7,415,426 B2 | 8/2008 | Williams et al. |
| 7,423,516 B2 | 9/2008 | Overhultz |
| 7,455,215 B2 | 11/2008 | McLeod et al. |
| 7,510,123 B2 | 3/2009 | Overhultz et al. |
| 7,535,337 B2 | 5/2009 | Overhultz et al. |
| 7,549,579 B2 | 6/2009 | Overhultz et al. |
| 7,614,556 B2 | 11/2009 | Overhultz et al. |
| 7,870,019 B2 | 1/2011 | Williams et al. |
| 7,921,036 B1 | 4/2011 | Sharma et al. |
| 8,010,067 B2 | 8/2011 | Pyne |
| 8,070,065 B2 | 12/2011 | Overhultz et al. |
| 8,082,177 B2 | 12/2011 | Williams et al. |
| 8,408,457 B2 | 4/2013 | Overhultz et al. |
| 8,531,273 B2 | 9/2013 | Overhultz et al. |
| 8,598,988 B2 | 12/2013 | Overhultz et al. |
| 8,700,453 B2 | 4/2014 | Scroggie et al. |
| 8,781,502 B1 | 7/2014 | Middleton et al. |
| 8,798,541 B1 | 8/2014 | Scott |
| 8,823,521 B2 | 9/2014 | Overhultz et al. |
| 8,837,954 B2 | 9/2014 | Primm et al. |
| 8,847,754 B2 | 9/2014 | Buchheim et al. |
| 9,107,152 B1 | 8/2015 | Wurster |
| 9,202,245 B2 | 12/2015 | Kostka et al. |
| 9,298,677 B2 | 3/2016 | Tollinger et al. |
| 9,363,784 B1 | 6/2016 | Friday et al. |
| 9,426,627 B1 | 8/2016 | Logan et al. |
| 9,544,744 B2 | 1/2017 | Postrel |
| 9,619,803 B2 | 4/2017 | Chandrasekaran et al. |
| 9,629,113 B2 | 4/2017 | Ren et al. |
| 9,646,328 B1 | 5/2017 | Skifstrom et al. |
| 9,679,310 B1 | 6/2017 | Saltzstein et al. |
| 9,811,846 B2 | 11/2017 | Fernandez |
| 9,898,749 B2 | 2/2018 | Argue et al. |
| 9,928,536 B2 | 3/2018 | Fernandez |
| 9,929,876 B2 | 3/2018 | Davis et al. |
| 9,953,493 B1 | 4/2018 | Davis |
| 10,132,911 B1 | 11/2018 | Bullock |
| 10,222,279 B1 | 3/2019 | Legrand, III et al. |
| 10,262,331 B1 | 4/2019 | Sharma et al. |
| 10,719,806 B1 | 7/2020 | Riemenschneider et al. |
| 2002/0082921 A1 | 6/2002 | Rankin |
| 2002/0176388 A1 | 11/2002 | Rankin et al. |
| 2002/0183004 A1 | 12/2002 | Fulton et al. |
| 2002/0197015 A1 | 12/2002 | Shaw |
| 2003/0167347 A1 | 9/2003 | Combs et al. |
| 2004/0056091 A1 | 3/2004 | Overhultz et al. |
| 2006/0080460 A1 | 4/2006 | Kobayashi et al. |
| 2006/0087474 A1 | 4/2006 | Do et al. |
| 2006/0109125 A1 | 5/2006 | Overhultz et al. |
| 2006/0114832 A1 | 6/2006 | Hamilton et al. |
| 2006/0208070 A1 | 9/2006 | Kato et al. |
| 2006/0290519 A1 | 12/2006 | Boate et al. |
| 2007/0067203 A1 | 3/2007 | Gil et al. |
| 2007/0069867 A1 | 3/2007 | Fleisch et al. |
| 2007/0114291 A1 | 5/2007 | Pouchak |
| 2007/0254670 A1 | 11/2007 | Kawaguchi et al. |
| 2007/0285385 A1 | 12/2007 | Albert et al. |
| 2008/0021766 A1 | 1/2008 | McElwaine et al. |
| 2008/0045172 A1 | 2/2008 | Narayanaswami et al. |
| 2008/0243626 A1 | 10/2008 | Stawar et al. |
| 2008/0256510 A1 | 10/2008 | Auerbach |
| 2008/0284566 A1 | 11/2008 | Zai et al. |
| 2009/0030787 A1 | 1/2009 | Pon et al. |
| 2009/0288132 A1 | 11/2009 | Hegde |
| 2009/0322510 A1 | 12/2009 | Berger et al. |
| 2010/0109864 A1 | 5/2010 | Haartsen et al. |
| 2010/0121567 A1 | 5/2010 | Mendelson |
| 2010/0131352 A1 | 5/2010 | Malhotra et al. |
| 2010/0156606 A1 | 6/2010 | Gold |
| 2010/0182431 A1 | 7/2010 | Pansegrouw |
| 2010/0201488 A1 | 8/2010 | Stern et al. |
| 2010/0201891 A1 | 8/2010 | Laroia et al. |
| 2010/0235373 A1 | 9/2010 | Holden et al. |
| 2011/0026506 A1 | 2/2011 | MacNaughtan et al. |
| 2011/0145063 A1 | 6/2011 | Qureshi et al. |
| 2011/0178862 A1 | 7/2011 | Daigle |
| 2011/0178863 A1 | 7/2011 | Daigle |
| 2012/0142271 A1 | 6/2012 | Zhodzishsky et al. |
| 2012/0166241 A1 | 6/2012 | Livingston et al. |
| 2012/0171958 A1 | 7/2012 | Cornett et al. |
| 2012/0191530 A1 | 7/2012 | Williams et al. |
| 2012/0228240 A1 | 9/2012 | Gentile et al. |
| 2012/0238504 A1 | 9/2012 | Curlander et al. |
| 2012/0306617 A1 | 12/2012 | Tung |
| 2012/0310570 A1 | 12/2012 | Pyne et al. |
| 2012/0315839 A1 | 12/2012 | Mumcuoglu et al. |

(56) References Cited

U.S. PATENT DOCUMENTS

| | | |
|---|---|---|
| 2012/0322459 A1 | 12/2012 | Jaffri et al. |
| 2013/0013407 A1 | 1/2013 | Scroggie et al. |
| 2013/0073431 A1 | 3/2013 | Suro et al. |
| 2013/0210461 A1 | 8/2013 | Moldavsky et al. |
| 2013/0217332 A1 | 8/2013 | Mtman et al. |
| 2013/0268316 A1 | 10/2013 | Moock et al. |
| 2014/0090489 A1 | 4/2014 | Taylor |
| 2014/0113560 A1 | 4/2014 | Graube et al. |
| 2014/0142271 A1 | 5/2014 | Munoz et al. |
| 2014/0236728 A1 | 8/2014 | Wright |
| 2014/0244341 A1 | 8/2014 | Purcell et al. |
| 2014/0249918 A1 | 9/2014 | Scroggie et al. |
| 2014/0249928 A1 | 9/2014 | McMillan et al. |
| 2014/0254466 A1 | 9/2014 | Wurster et al. |
| 2014/0269508 A1 | 9/2014 | Donaldson |
| 2014/0278742 A1 | 9/2014 | MacMillan et al. |
| 2014/0282620 A1 | 9/2014 | Nuovo et al. |
| 2014/0316896 A1 | 10/2014 | McMillan |
| 2014/0324615 A1 | 10/2014 | Kulkarni et al. |
| 2014/0324638 A1 | 10/2014 | Khalid |
| 2014/0337151 A1 | 11/2014 | Crutchfield |
| 2014/0358666 A1 | 12/2014 | Baghaie et al. |
| 2014/0359565 A1 | 12/2014 | Frankel et al. |
| 2015/0012391 A1 | 1/2015 | Elberbaum |
| 2015/0019391 A1 | 1/2015 | Kumar et al. |
| 2015/0025936 A1 | 1/2015 | Garel et al. |
| 2015/0026020 A1 | 1/2015 | Overhultz et al. |
| 2015/0081474 A1 | 3/2015 | Kostka et al. |
| 2015/0082382 A1 | 3/2015 | Maguire et al. |
| 2015/0100403 A1 | 4/2015 | Roberts et al. |
| 2015/0120463 A1 | 4/2015 | Cannon et al. |
| 2015/0140982 A1 | 5/2015 | Postrel |
| 2015/0142387 A1 | 5/2015 | Alarcon et al. |
| 2015/0142552 A1 | 5/2015 | Schmehl et al. |
| 2015/0079942 A1 | 6/2015 | Kostka et al. |
| 2015/0161665 A1 | 6/2015 | Grimes et al. |
| 2015/0206096 A1 | 7/2015 | Fernandez |
| 2015/0215781 A1 | 7/2015 | Meere et al. |
| 2015/0227368 A1 | 8/2015 | Gonion |
| 2015/0228004 A1 | 8/2015 | Bednarek et al. |
| 2015/0237463 A1 | 8/2015 | Stuttle et al. |
| 2015/0248663 A1 | 9/2015 | Meere et al. |
| 2015/0249058 A1 | 9/2015 | Cowley et al. |
| 2015/0262117 A1 | 9/2015 | Li |
| 2015/0278867 A1 | 10/2015 | Lerman et al. |
| 2015/0278888 A1 | 10/2015 | Lu et al. |
| 2015/0281877 A1 | 10/2015 | Walden et al. |
| 2015/0287045 A1 | 10/2015 | Brown et al. |
| 2015/0317661 A9 | 11/2015 | Roberts et al. |
| 2015/0350974 A1 | 12/2015 | Patil et al. |
| 2015/0356610 A1 | 12/2015 | Ponoth |
| 2015/0358819 A1 | 12/2015 | Dipaola |
| 2015/0363764 A1 | 12/2015 | Grigg et al. |
| 2015/0371321 A1 | 12/2015 | Chapuis et al. |
| 2016/0026032 A1 | 1/2016 | Moore |
| 2016/0034954 A1 | 2/2016 | Tollinger et al. |
| 2016/0042251 A1 | 2/2016 | Cordova-Diba et al. |
| 2016/0050645 A1 | 2/2016 | Wurster et al. |
| 2016/0092943 A1 | 3/2016 | Vigier et al. |
| 2016/0092966 A1 | 3/2016 | Vigier et al. |
| 2016/0094940 A1 | 3/2016 | Vigier et al. |
| 2016/0095063 A1 | 3/2016 | Vigier et al. |
| 2016/0110622 A1 | 4/2016 | Herring et al. |
| 2016/0110757 A1 | 4/2016 | Vermolen et al. |
| 2016/0134930 A1 | 5/2016 | Swafford |
| 2016/0148270 A1 | 5/2016 | Vigier et al. |
| 2016/0156638 A1 | 6/2016 | Somani et al. |
| 2016/0171486 A1 | 6/2016 | Wagner et al. |
| 2016/0171512 A1 | 6/2016 | Buck et al. |
| 2016/0179379 A1 | 6/2016 | Moraru et al. |
| 2016/0189132 A1 | 6/2016 | Cash et al. |
| 2016/0217519 A1 | 7/2016 | Kozat et al. |
| 2016/0225029 A1 | 8/2016 | Vandevelde et al. |
| 2016/0227359 A1 | 8/2016 | Hurewitz et al. |
| 2016/0232560 A1 | 8/2016 | VanDeVelde |
| 2016/0253735 A1 | 9/2016 | Seudillo et al. |
| 2016/0260301 A1 | 9/2016 | Miller et al. |
| 2016/0316361 A1 | 10/2016 | Bhargave et al. |
| 2016/0323717 A1 | 11/2016 | Friday et al. |
| 2016/0371735 A1 | 12/2016 | Walden |
| 2017/0026788 A1 | 1/2017 | Kostka et al. |
| 2017/0032354 A1 | 2/2017 | Tilahun et al. |
| 2017/0053317 A1 | 2/2017 | Dione |
| 2017/0124603 A1 | 5/2017 | Olson et al. |
| 2017/0148077 A1 | 5/2017 | Phillips et al. |
| 2017/0148991 A1 | 5/2017 | Duggeli et al. |
| 2017/0169444 A1 | 6/2017 | Householder |
| 2017/0178104 A1 | 6/2017 | Fernandez |
| 2017/0186068 A1 | 6/2017 | Dumouchel et al. |
| 2017/0228776 A1 | 8/2017 | Walden et al. |
| 2017/0242427 A9 | 8/2017 | High et al. |
| 2017/0245284 A1 | 8/2017 | Hassan et al. |
| 2017/0276061 A1 | 9/2017 | Boyer et al. |
| 2018/0012259 A1 | 1/2018 | Lazo |
| 2018/0027386 A1 | 1/2018 | Zampini |
| 2018/0047059 A1 | 2/2018 | Lazo et al. |
| 2018/0096566 A1 | 4/2018 | Blair, II et al. |
| 2018/0107576 A1 | 4/2018 | Walden et al. |
| 2018/0108043 A1 | 4/2018 | Walden et al. |
| 2018/0158382 A1 | 6/2018 | Yoshie et al. |
| 2018/0165711 A1 | 6/2018 | Montemayor et al. |
| 2018/0189819 A1 | 7/2018 | Levi |
| 2018/0322376 A1 | 11/2018 | Henry et al. |
| 2018/0335781 A1 | 11/2018 | Chase et al. |
| 2019/0108474 A1 | 4/2019 | Tripathi |
| 2019/0328159 A1 | 10/2019 | Marivoet et al. |
| 2020/0150213 A1 | 5/2020 | Oh et al. |
| 2020/0331675 A1 | 10/2020 | Jones |
| 2021/0274316 A1 | 9/2021 | Laakkonen et al. |

FOREIGN PATENT DOCUMENTS

| | | |
|---|---|---|
| CA | 2519621 A1 | 10/2004 |
| CA | 2586576 A1 | 5/2006 |
| CA | 2587925 A1 | 5/2006 |
| CA | 2709651 A1 | 12/2010 |
| CN | 100447811 C | 12/2008 |
| EP | 2372627 A2 | 10/2011 |
| WO | 2013054144 A1 | 4/2013 |
| WO | 2014207646 A1 | 12/2014 |

OTHER PUBLICATIONS

Non Final Office Action for U.S. Appl. No. 15/248,063, dated Oct. 5, 2018, 18 pages.
Non Final Office Action for U.S. Appl. No. 15/433,334, dated Apr. 29, 2019, 15 pages.
Non Final Office Action for U.S. Appl. No. 15/433,334, dated Jul. 1, 2020, 39 pages.
Non Final Office Action for U.S. Appl. No. 15/726,146, dated Aug. 10, 2020, 15 pages.
Non Final Office Action for U.S. Appl. No. 15/980,345, dated Jun. 1, 2020, 46 pages.
Non Final Office Action for U.S. Appl. No. 15/980,345, dated Oct. 29, 2020, 18 pages.
Non Final Office Action for U.S. Appl. No. 15/997,213, dated Dec. 21, 2018, 40 pages.
Notice of Allowance for U.S. Appl. No. 15/153,135, dated Mar. 25, 2021, 30 pages.
Notice of Allowance for U.S. Appl. No. 15/153,142, dated Feb. 26, 2021, 32 pages.
Notice of Allowance for U.S. Appl. No. 15/153,155, dated Mar. 10, 2021, 36 pages.
Notice of Allowance for U.S. Appl. No. 15/153,173, dated Mar. 5, 2021, 25 pages.
Notice of Allowance for U.S. Appl. No. 15/153,200, dated Apr. 17, 2019, 15 pages.
Notice of Allowance for U.S. Appl. No. 15/153,213, dated Jan. 30, 2018, 7 pages.
Notice of Allowance for U.S. Appl. No. 15/248,057, dated Mar. 22, 2021, 25 pages.

(56) References Cited

OTHER PUBLICATIONS

Notice of Allowance for U.S. Appl. No. 15/726,138, dated Jul. 27, 2020, 35 pages.
Notice of Allowance for U.S. Appl. No. 15/980,345, dated Jun. 10, 2021, 16 pages.
Smiley, "Active RFID vs. Passive RFID: What's the Difference?", https://blog.atlasrfidstore.com/active-rfid-vs-passive-fid, Mar. 4, 2016, 23 pages.
Swedberg, C., "The System, Slated for Supermarket Pilots, Will Weight Products, Determine What Has Been Removed, and Automatically Charge A Customer Based on That Person's RFID-enabled loyalty card or wristband", RFID Journal, 2011, 2 pages.
Trademark Electronic Search System (TESS), Bluetooth, Nov. 26, 2019, United States Patent and Trademark Office, 3 pages.
Vermesan et al., Editors, "Internet of Things—From Research and Innovation to Market Deployment", River Publishers, 2014, pp. 92-97.
Wirth, N., "Algorithms + Data Structures = Programs", Prentice Hall Series in Automatic Computation, 1976, 76 pages.
Zittrain, "The future of the internet—and how to stop it", Yale University, 2008, Chapters 1-9, pp. 11-18.
Entire patent prosecution history of U.S. Appl. No. 15/248,057, filed Aug. 26, 2016, entitled, "System and Methods for Determining Location of Pop Displays With Wireless Beacons Using Mobile Applications on Mobile Devices."
Entire patent prosecution history of U.S. Appl. No. 15/153,135, filed May 12, 2016, entitled, "Systems and Methods for Dynamically Transmitting Content to Potential Customers."
Anderson, "The Wi-Fi Revolution", https://www.wired.com///wifirevolution/, May 1, 2003, 20 pages.
Dahlgren et al., "Evaluation of Indoor Positioning Based on Bluetooth® Smart Technology", Master of Science Thesis in the Porgramme Computer Systems and Networks, Chalmers University of Technology, Department of Computer Science and Engineering, 2014, 94 pages.
Final Office Action for U.S. Appl. No. 14/183,116, dated May 2, 2017, 53 pages.
Final Office Action for U.S. Appl. No. 14/238,613, dated May 19, 2016, 39 pages.
Final Office Action for U.S. Appl. No. 14/238,613, dated Oct. 13, 2017, 46 pages.
Final Office Action for U.S. Appl. No. 14/668,289, dated Jun. 22, 2016, 56 pages.
Final Office Action for U.S. Appl. No. 14/668,289, dated Sep. 29, 2017, 19 pages.
Final Office Action for U.S. Appl. No. 15/153,142, dated Apr. 24, 2019, 14 pages.
Final Office Action for U.S. Appl. No. 15/153,142, dated Aug. 24, 2020, 17 pages.
Final Office Action for U.S. Appl. No. 15/153,155, dated Apr. 24, 2019, 14 pages.
Final Office Action for U.S. Appl. No. 15/153,155, dated Aug. 24, 2020, 16 pages.
Final Office Action for U.S. Appl. No. 15/153,173, dated Apr. 24, 2019, 15 pages.
Final Office Action for U.S. Appl. No. 15/153,173, dated Aug. 24, 2020, 13 pages.
Final Office Action for U.S. Appl. No. 15/153,213, dated Oct. 19, 2017, 38 pages.
Final Office Action for U.S. Appl. No. 15/248,057, dated Jul. 13, 2020, 22 pages.
Final Office Action for U.S. Appl. No. 15/248,063, dated Apr. 25, 2019, 13 pages.
Final Office Action for U.S. Appl. No. 15/433,334, dated Oct. 21, 2020, 37 pages.
Final Office Action for U.S. Appl. No. 15/726,108, dated Aug. 10, 2020, 62 pages.
Final Office Action for U.S. Appl. No. 15/726,128, dated Jul. 20, 2020, 17 pages.
Final Office Action for U.S. Appl. No. 15/726,146, dated Feb. 4, 2021, 34 pages.
Final Office Action for U.S. Appl. No. 15/980,345, dated Mar. 2, 2021, 22 pages.
Final Office Action for U.S. Appl. No. 15/980,345, dated Sep. 14, 2020, 18 pages.
Gupta, N., "Inside Bluetooth Low Energy", Artech House, p. xxv-14, pp. 131-143.
International Preliminary Report on Patentability for International Application No. PCT/US2012/030403, dated Feb. 18, 2014, 10 pages.
International Search Report for International Application No. PCT/US2012/030403, dated Jul. 6, 2012, 2 pages.
Interview Summary for U.S. Appl. No. 15/153,213, dated Aug. 21, 2017, 4 pages.
Klein, G., "Streetlights and Shadows", MIT Press, 2009, pp. 33-47.
Leone, A., "Interoperability in Electronic Systems" Embedded Systems, Krzystof, John Wiley, 2013, pp. 259-265.
Melià-Segu et al., "Human-Object Interaction Reasoning Using RFID-Enabled Smart Shelf", 2014 International Conference on the Internet of Things, Feb. 2021, IEEE Xplore, pp. 37-42.
Minoli, D., "Building the Internet of Things with IPv6 and MIPv6", Wiley 2013, 8 pages.
Non Final Office Action for U.S. Appl. No. 14/171,544, dated Apr. 2, 2015, 9 pages.
Non Final Office Action for U.S. Appl. No. 14/183,116, dated Mar. 5, 2018, 40 pages.
Non Final Office Action for U.S. Appl. No. 14/183,116, dated Sep. 9, 2016, 36 pages.
Non Final Office Action for U.S. Appl. No. 14/238,613, dated Feb. 1, 2017 ,47 pages.
Non Final Office Action for U.S. Appl. No. 14/238,613, dated Nov. 12, 2015, 37 pages.
Non Final Office Action for U.S. Appl. No. 14/668,289, dated Dec. 31, 2015, 11 pages.
Non Final Office Action for U.S. Appl. No. 14/668,289, dated Jan. 20, 2017, 16 pages.
Non Final Office Action for U.S. Appl. No. 15/153,135, dated Apr. 29, 2020, 15 pages.
Non Final Office Action for U.S. Appl. No. 15/153,135, dated Jul. 13, 2018, 38 pages.
Non Final Office Action for U.S. Appl. No. 15/153,135, dated Oct. 8, 2020, 25 pages.
Non Final Office Action for U.S. Appl. No. 15/153,142, dated Jun. 14, 2018, 49 pages.
Non Final Office Action for U.S. Appl. No. 15/153,155, dated Jun. 22, 2018, 42 pages.
Non Final Office Action for U.S. Appl. No. 15/153,163, dated Jan. 22, 2019, 17 pages.
Non Final Office Action for U.S. Appl. No. 15/153,163, dated Jun. 13, 2018, 53 pages.
Non Final Office Action for U.S. Appl. No. 15/153,173, dated Jun. 13, 2018, 53 pages.
Non Final Office Action for U.S. Appl. No. 15/153,180, dated Jul. 26, 2018, 52 pages.
Non Final Office Action for U.S. Appl. No. 15/153,186, dated Feb. 19, 2019, 11 pages.
Non Final Office Action for U.S. Appl. No. 15/153,200, dated Aug. 10, 2018, 56 pages.
Non Final Office Action for U.S. Appl. No. 15/153,213, dated Mar. 24, 2017, 55 pages.
Non Final Office Action for U.S. Appl. No. 15/153,220, dated Aug. 27, 2019, 51 pages.
Notice of Allowance for U.S. Appl. No. 15/980,365, dated Nov. 2, 2021, 14 pages.
Allurwar et al., "Beacon for Proximity Target Marketing," International Journal of Engineering And Computer Science, May 2016, vol. 5, Issue 5, pp. 16359-16364.
Ning, "An iBeacon-Based Location-Aware Advertising System," MS Thesis, University of Waterloo, 2015, 40 pages.
Notice of Allowance for U.S. Appl. No. 15/726,128, dated Sep. 15, 2021, 20 pages.

(56) References Cited

OTHER PUBLICATIONS

Non Final Office Action for U.S. Appl. No. 15/980,365, dated Sep. 29, 2021, 64 pages.
Notice of Allowance for U.S. Appl. No. 15/726,108, dated Sep. 22, 2021, 49 pages.

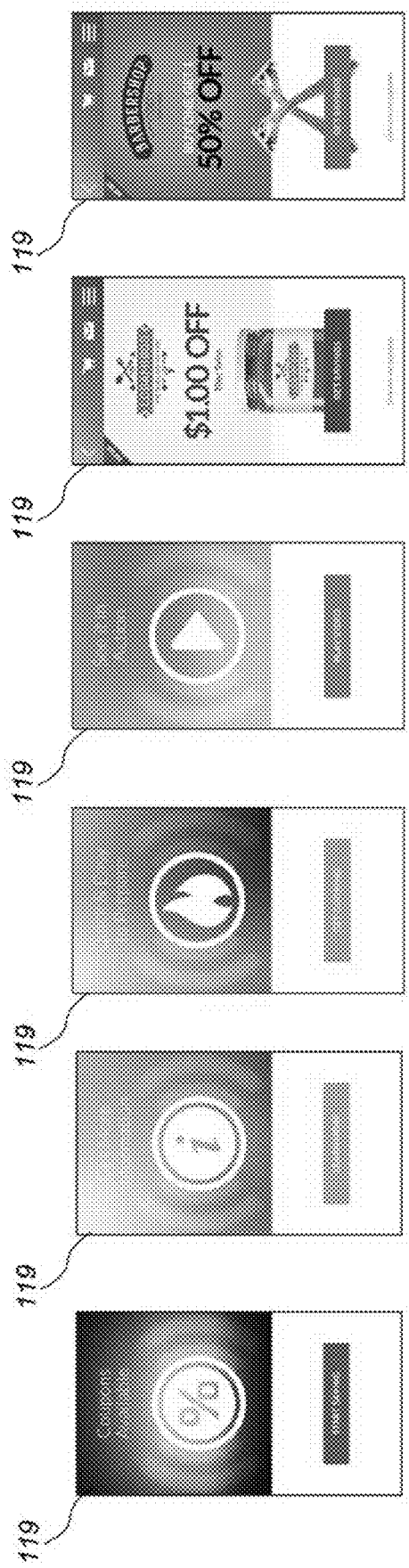
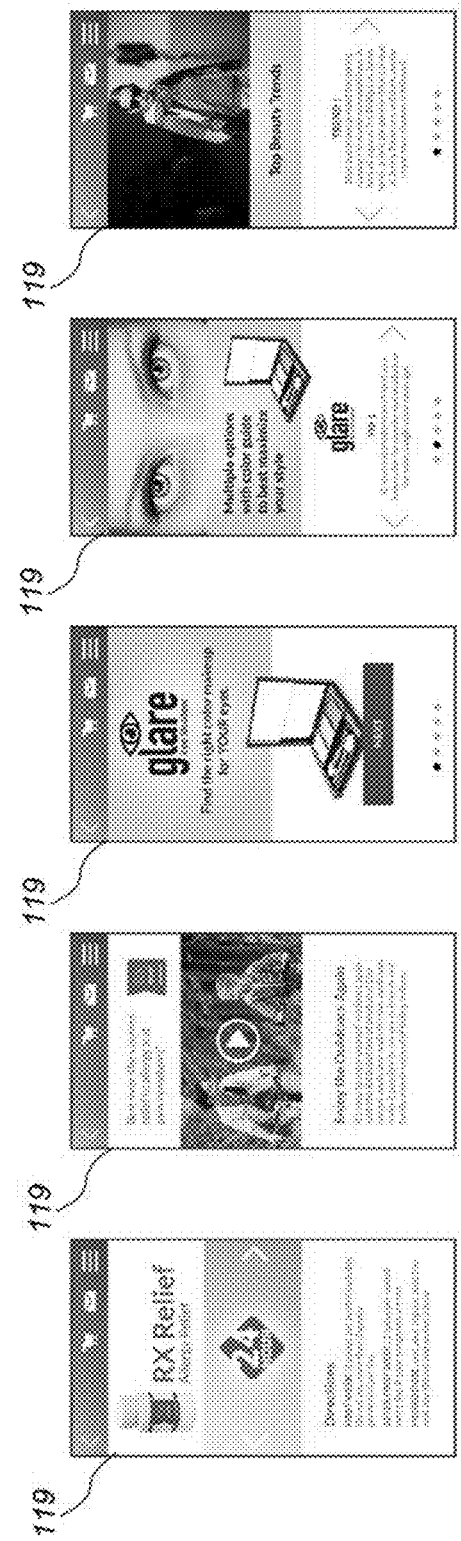

SYSTEM AND METHODS FOR DETERMINING LOCATION OF POP DISPLAYS WITH WIRELESS BEACONS USING MOBILE APPLICATIONS ON MOBILE DEVICES

CROSS-REFERENCE TO RELATED APPLICATIONS

This Application is a continuation of U.S. patent application Ser. No. 15/248,057, filed Aug. 26, 2016; U.S. patent application Ser. No. 15/248,057 is a continuation of U.S. patent application Ser. No. 15/153,135, filed May 12, 2016; U.S. patent application Ser. No. 15/153,135 claims priority to U.S. Provisional Patent Application No. 62/160,949, filed May 13, 2015, U.S. Provisional Patent Application No. 62/256,248, filed Nov. 17, 2015, and U.S. Provisional Patent Application No. 62/291,828, filed Feb. 5, 2016, each of which are incorporated herein by reference in their entirety for all purposes.

BACKGROUND OF THE INVENTION

1. Field of the Invention

Embodiments disclosed herein relate to the use of wireless beacons in point of purchase ("POP") displays to facilitate the delivery of consumer oriented content to mobile devices. Certain embodiments relate to systems and methods for determining locations of wireless beacons and POP displays using mobile applications on mobile devices.

2. Description of the Relevant Art

POP ("point of purchase") displays are often used in retail environments to display content for particular products associated with the POP displays. POP displays typically include signs, graphics, or other marketing materials that communicate information about associated products and are intended to draw a shopper's (e.g., customer's) attention to the products associated with the displays. POP displays may be used as integral components for marketing or promotional campaigns. POP displays often contribute to the success of these campaigns.

Traditional POP display signage, which runs the gamut from a simple plastic holder for a card with product information to illuminated translucent graphic films in an atmospheric light box, are static in nature and are unable to customize the information conveyed to a potential customer based upon the customer's interest level. Other conventional POP display signage may include video displays that offer limited interactive options. Thus, there is a need for POP displays that are capable of dynamically interacting with potential customers. The manufacture, distribution, and/or deployment in retail settings of multiple POP displays, however, poses unique challenges, especially when the ability to dynamically interact with potential customers is included with the POP displays. Developments in mobile device technology and mobile communication technology allows for dynamic interaction with potential customers in retail environment.

Beacons are among the most important new mobile technologies helping merchants engage with consumers via mobile communication while the consumers are in brick and mortar stores. For many years, near field communication (NFC) was considered to be the technology that would deliver such data to retailers and help them track how customers behave in-store. NFC, however, has reached certain limits and beacons (and beacon technology) provides increased potential for providing customer engagement to shoppers in store environments.

Beacons may be low-cost devices that communicate with mobile device (e.g., smartphone) apps through a Bluetooth® signal. Beacons are expected to directly influence over $4 billion worth of US retail sales this year at top retailers (0.1% of the total), and that number may climb tenfold in 2016. Current beacon implementations are relatively crude and typically broadcast the same, static content (e.g., a coupon, regardless of circumstances or a potential customer's demonstrated intent). Beacon technology has enormous potential to enhance the shopping experience. For example, beacon technology may make it quicker and easier for customers to access the information and products they are looking for or provide special offers or discounts to loyal shoppers. Beacon technology can also provide retailers with invaluable data about their customers' shopping habits as well as the activity of their staff. Thus, retailers may make improvements to the store layout by identifying store flow, maintaining service standards, and maintaining operations that will benefit both customer and retailer. Current implementations of beacon technology, however, have failed to develop a more dynamic set of interactions with potential customers, particularly those which are based on and distinguish between various location-based actions.

There has been some development in the use of beacon technology in store (customer) environments, however, the implementation of beacon technology remains limited.

United States Patent Application Publication No. 2015/0287045, filed Apr. 6, 2015 by Brown et al., which is incorporated by reference as if fully set forth herein, describes a "system for monitoring compliance with a retail display program includes a beacon coupled to a promotional display structure." The system includes a "computing device [that] is configured to compare the location-specific data and time stamp to the specified retail facility and time period to determine whether the promotional display structure is displayed in the specified retail facility during the specified time period." The system in Brown, however, requires that "Each promotional display structure 20 is intended to be displayed at a specified retail facility 50. Moreover, in the example embodiment, each promotional display structure 20 is intended to be displayed at a specified location 60 within specified retail facility 50." Thus, the system of Brown requires that the intended location of each "promotional display structure" be known before the display structures are sent to their locations so that compliance of the structure (e.g., is it displayed in the correct location) may be determined. However, as is known in the art of promotional displays, it can often be very difficult and cumbersome to ensure and know the intended locations of promotional displays. For example, a large set of identical promotional displays are often sent to a warehouse for storage before being randomly sent out to retail locations without any thought being given as to the intended location for each specific promotional display. Further, multiple locations within a retail location may be intended for a given display once it reaches the retail location.

United States Patent Application Publication No. 2014/0282620, filed Mar. 15, 2013 by Nuovo et al., which is incorporated by reference as if fully set forth herein, states: "detecting an advertised device identifier and comparing the detected device identifier with device identifiers stored on the mobile device. If there is a match, the match can trigger an event. The event can be requesting content associated with the matched device identifier, receiving the requested content, and rendering the received content. The requested content can be selected to have additional, corresponding content downloaded and rendered." This identification is done by "an application that operates on a mobile device. When executed, the application can cause the mobile device to search for device identifiers, e.g., media access controller addresses and/or broadcast identifiers (IDs), which are advertised by wireless beacon units, such as Wi-Fi beacon units and Bluetooth beacon units."

United States Patent Application Publication No. 2002/0176388 filed Mar. 19, 2002, by Rankin and Simons, which is incorporated by reference as if fully set forth herein, describes a centralized system for updating beacons. The system includes "a modification to the Bluetooth system to enable the connectionless broadcast of short messages from Bluetooth beacons. This can be achieved by exploiting the Bluetooth Inquiry phase by extending the very short ID packet sent out during this mode and using the extra space thus gained to carry a small amount of information. This information can be Bluetooth system related data or one-way application data. This scheme has the potentially useful feature of being backwards-compatible with legacy Bluetooth devices that are not able to understand this extra field."

United States Patent Application Publication No. 2002/0183004 filed Mar. 15, 2002, by Fulton et al., which is incorporated by reference as if fully set forth herein, describes specialized beacons that are dedicated to either inquiries or transmitting information to a client.

United States Patent Application Publication No. 2007/0254670, filed May 1, 2006, "System and method for optimizing throughput in a wireless network," by Kawaguchi and Le, which is incorporated by reference as if fully set forth herein, discusses throttling bandwidth within a mesh network. For example, "When the switch 10 determines that a selected mesh node is utilizing a portion of the bandwidth outside of the predetermined threshold range, the switch 10 executes a predetermined action (e.g., throttling) on transmissions from the selected node to provide increased bandwidth to mesh nodes further from the switch 10 than the selected node."

WIPO Patent Application WO/2013/054144, "Method of Estimating the Position of a User Device Using Radio Beacons and Radio Beacons Adapted to Facilitate the Methods of the Invention" by Usman, et al., which is incorporated by reference as if fully set forth herein, discloses methods for "calculating an estimate of the position of the user device taking into account transmit power data concerning the transmit power level of the one or more said radio beacons . . . " Page 2, lines 16-18.

U.S. Pat. No. 6,571,279, issued to Herz et al., which is incorporated by reference as if fully set forth herein, discloses location based services, but more from the perspective of a cellular network. It states, "The operation of the location enhanced information delivery system as described herein makes use of the fact that each user has a 'beacon', which generally serves as a user identification instrumentality. The beacons emit identifiers which can be used to associate users with the detected devices. The beacon can be correlated with location, such as by use of a wireless subscriber station or other systems with known technology."

United States Patent Application Publication No. 2014/0358666, "Cross-Channel Personalized Promotion Platform," by Baghaie and Dempski, which is incorporated by reference as if fully set forth herein, describes a platform for allowing advertisers to purchase promotional opportunities on user's mobile devices.

United States Patent Application Publication No. 2012/0315839, "Analyzing Audiences at Public Venues," by Mumcuoglu and Engel, which is incorporated by reference as if fully set forth herein, discusses the use of wireless signals to physically locate a user but does not discuss the utilization of that information in real time to transmit pertinent information to that user.

Despite the previous disclosures described above, there remains many needs related to the concepts of adjusting or "throttling" a connection (or a transmission), determination of bumping, or the notions of pushing or pulling content beyond generic downloading of specific content from a centralized server as discussed herein. In addition, there is still a need for monitoring surrounding activity and assessing user locations and/or display locations. In certain applications, transmissions (or connections) may need to be throttled with respect to a specific location (e.g., a point of sale). In some applications, there is a need for the content transmitted over that connection to be varied in relation to either the throttling or determined range. Thus, there are still improvements needed in the application of beacon technology to engage with customers during their in-store shopping experience and for supporting customers' in-store shopping experiences.

SUMMARY OF THE INVENTION

In certain embodiments, context aware solutions are provided for delivering content to potential customers in an efficient manner in association with POP ("point of purchase") displays that are used in retail environments. Embodiments disclosed herein include wireless beacon technology associated with the POP displays that can vary the content delivered based upon the relative distance of the potential customer and whether the potential customer has indicated any product interest. This allows for content to be "throttled" to potential customers based on a software configuration that exempts customers who have not signaled interest from being included in messages that might overload and/or annoy the customers and/or trigger privacy concerns due to unrequested content. Potential customers that have signaled interest, however, may receive content without any throttling. Furthermore, embodiments disclosed herein may distinguish between "push"—use cases where content is provided without an intentional request by the customer—and "pull"—use cases where content has been intentionally requested by the customer through a physical interaction between the POP display and a customer device (e.g., the customer device being "bumped", i.e., intentionally placed in close proximity to an area on the POP display). The exact information that is pushed or pulled may be located on a remote server that may be configured for each potential use case. Embodiments disclosed herein may provide implementations that conserve power by allowing devices (e.g., wireless beacons) to be configured to activate at a later date, namely after they have arrived at a certain destination (e.g., a display location). Embodiments disclosed herein may provide for utilizing context awareness to reduce power consumption when it is unlikely for a potential customer to be around (e.g., when a retail area is dark or no activity is detected). Furthermore, this context awareness may enable manufacturing and distributions methods to be suited to large-scale production and distribution of POP displays across many locations. Improved logistical schemes for manufacturing and distributing the embodiments disclosed herein may also be provided since one need not determine beforehand the exact final location of the POP display and its beacon before distribution to individual retail or advertising venues.

In certain embodiments, the disclosed systems and methods include a variety of sensors to aid in assessing a proximity of potential customers to the POP display and measuring the surrounding environment. This information may be recorded and analyzed to gain additional insights about consumer behavior and to gauge the device's performance. Additionally, information may be inferred from the signal strength of user devices (e.g., mobile devices) carried by potential customers. This information may also be retained and analyzed. In some embodiments, the system may transmit data to a server through various means. For example, a traditional permanent gateway may be utilized, or user devices with network connectivity that are carried by employees or potential customers may be utilized to relay the stored information to the server.

Embodiments disclosed herein may provide efficient means for communicating with individuals, either to inform or to advertise, and to record information about the disclosed embodiments' performance and its environment. In some embodiments, the recorded information is harnessed to enable improved logistical schemes to be provided for manufacturing and distributing the disclosed embodiments even when it is unknown where and/or when the disclosed device will be delivered and/or begin operation.

In certain embodiments, an apparatus includes: a processor; a display; a wireless transceiver; a memory cache; and a software package installed on the mobile device, the software package including a mobile application and a software developer kit (SDK) configured to interpret wireless data packets received by the mobile device; wherein the mobile device is configured to: receive a data packet in a wireless signal through the wireless transceiver, the wireless signal being broadcast by a circuit board coupled to a point of purchase (POP) display, the POP display including a consumer product display, wherein the consumer product display is configured to be associated with a selected campaign, wherein the POP display is configured to be distributed at random to a retail location selected from a plurality of retail locations associated with the selected campaign, wherein the circuit board includes a processor and a wireless beacon, the circuit board broadcasting the wireless signal from the wireless beacon, and wherein the wireless signal includes the data packet with a unique identifier for the wireless beacon; and provide a retail location of the mobile device and the unique identifier to a remote server in response to receiving the data packet including the unique identifier broadcast in the wireless signal, wherein the retail location of the mobile device is provided by the mobile application in the software package, and wherein the remote server is configured to associate the provided retail location of the mobile device with the wireless beacon to determine a selected retail location of the wireless beacon, the selected retail location being one of the retail locations associated with the selected campaign.

In certain embodiments, a method for assessing a location of a point of purchase (POP display) includes: receiving, in a mobile device at a selected retail location, a wireless signal including a data packet with a unique identifier for a wireless beacon, the wireless signal being broadcast by the wireless beacon, wherein the wireless beacon is located on a circuit board coupled to a point of purchase (POP) display, the POP display including a consumer product display, wherein the consumer product display is configured to be associated with a selected campaign, wherein the POP display is configured to be distributed at random to a retail location selected from a plurality of retail locations associated with the selected campaign; providing, from the mobile device to a remote server, a retail location of the mobile device in response to receiving the data packet including the unique identifier from the at least one wireless beacon at the selected retail location, wherein the retail location of the mobile device is provided by a mobile application in a software package installed on the mobile device in response to the mobile device receiving the data packet, and wherein the unique identifier for the wireless beacon is provided from the mobile device in addition to the retail location of the mobile device; and determining, at the remote server, the selected retail location of the POP display based on the provided unique identifier for the wireless beacon by associating the retail location of the mobile device with the wireless beacon.

In certain embodiments, a non-transient computer-readable medium including instructions that, when executed by one or more processors, causes the one or more processors to perform a method that includes: receiving, in a mobile device at a selected retail location, a wireless signal including a data packet with a unique identifier for a wireless beacon, the wireless signal being broadcast by the wireless beacon, wherein the wireless beacon is located on a circuit board coupled to a point of purchase (POP) display, the POP display including a consumer product display, wherein the consumer product display is configured to be associated with a selected campaign, wherein the POP display is configured to be distributed at random to a retail location selected from a plurality of retail locations associated with the selected campaign; providing, from the mobile device to a remote server, a retail location of the mobile device in response to receiving the data packet including the unique identifier from the at least one wireless beacon at the selected retail location, wherein the retail location of the mobile device is provided by a mobile application in a software package installed on the mobile device in response to the mobile device receiving the data packet, and wherein the unique identifier for the wireless beacon is provided from the mobile device in addition to the retail location of the mobile device; and determining, at the remote server, the selected retail location of the POP display based on the provided unique identifier for the wireless beacon by associating the retail location of the mobile device with the wireless beacon.

BRIEF DESCRIPTION OF THE DRAWINGS

Features and advantages of the methods and apparatus described herein will be more fully appreciated by reference to the following detailed description of presently preferred but nonetheless illustrative embodiments when taken in conjunction with the accompanying drawings in which:

FIGS. 3A-3K depict examples of content being displayed on a display of a mobile device.

DETAILED DESCRIPTION

Figure 1:
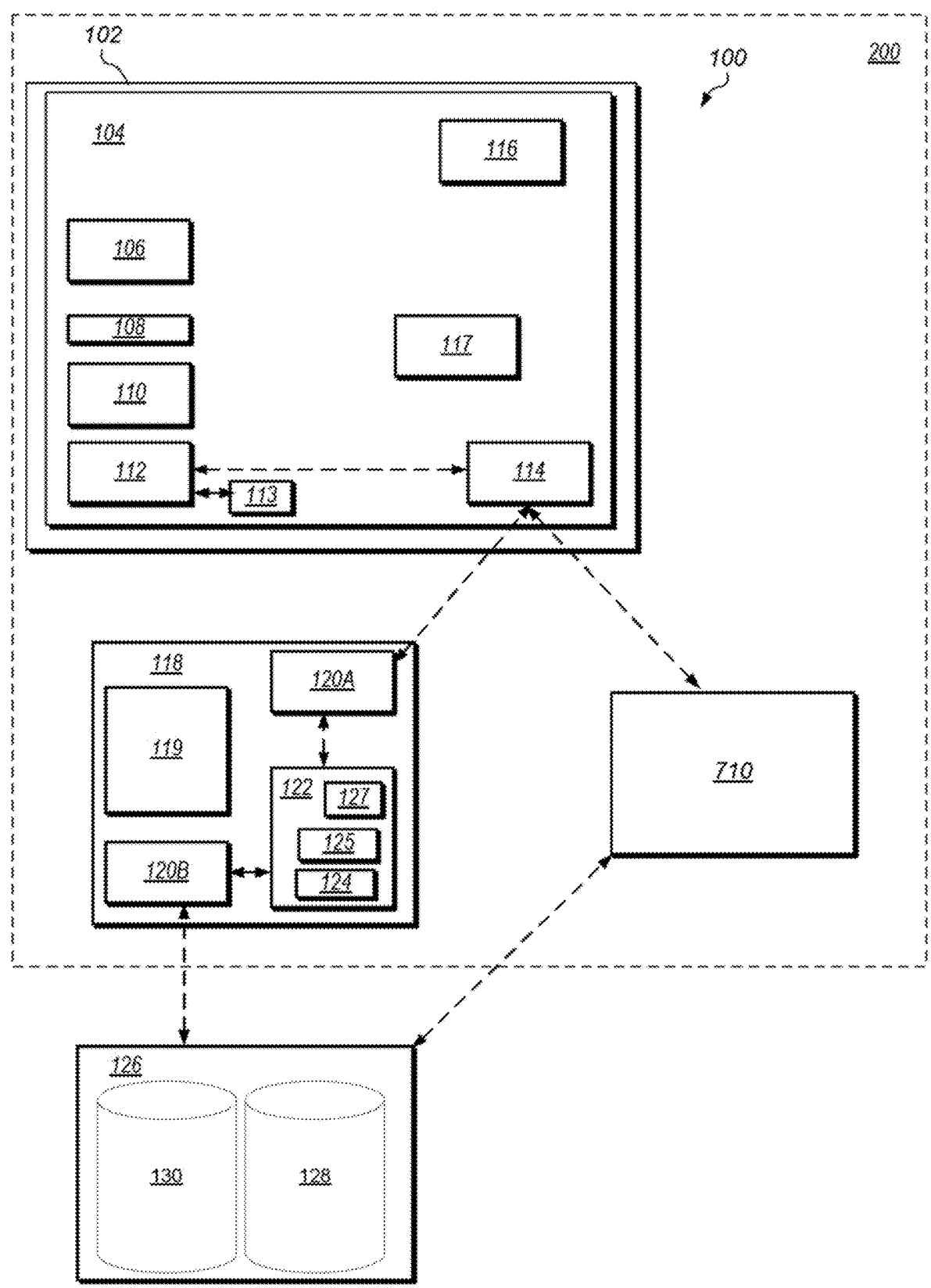
FIG. 1 depicts a block diagram of an embodiment of a point of purchase display system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The term "automatically" refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. The hardware circuits may include any combination of combinatorial logic circuitry, clocked storage devices such as flops, registers, latches, etc., finite state machines, memory such as static random access memory or embedded dynamic random access memory, custom designed circuitry, programmable logic arrays, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112(f) interpretation for that unit/circuit/component.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments.

The scope of the present disclosure includes any feature or combination of features disclosed herein (either explicitly or implicitly), or any generalization thereof, whether or not it mitigates any or all of the problems addressed herein.

Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Detailed Description Of Embodiments

The following examples are included to demonstrate preferred embodiments. It should be appreciated by those of skill in the art that the techniques disclosed in the examples which follow represent techniques discovered by the inventor to function well in the practice of the disclosed embodiments, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the disclosed embodiments.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the disclosed embodiments will be apparent to those skilled in the art in view of this description. Accordingly, this description is to be construed as illustrative only and is for the purpose of teaching those skilled in the art the general manner of carrying out the disclosed embodiments. It is to be understood that the forms of the disclosed embodiments shown and described herein are to be taken as examples of embodiments. Elements and materials may be substituted for those illustrated and described herein, parts and processes may be reversed, and certain features of the disclosed embodiments may be utilized independently, all as would be apparent to one skilled in the art after having the benefit of this description of the disclosed embodiments. Changes may be made in the elements described herein without departing from the spirit and scope of the disclosed embodiments as described in the following claims.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

As used herein, the word "display" is intended to include an array of merchandising materials and store-based assets such as, but not limited to, signs, test product or samples, permanent or semi-permanent fixtures, coupon dispensers, aisle-based video screens, mobile coolers, or other movable assets within a retail outlet.

FIG. 1 depicts a block diagram of an embodiment of point of purchase ("POP") display system 100. In certain embodiments, system 100 includes POP display 102. In certain embodiments, circuit board 104 is located on POP display 102. Circuit board 104 may be, for example, a printed circuit board or any other suitable circuit board for connecting and operating multiple electronic components including, but not limited to, integrated circuits. Circuit board 104 may be placed (installed) on, or coupled to, POP display 102 during or after manufacturing of the POP display.

In certain embodiments, circuit board 104 includes battery 106, switch 108, memory 110, controller 112, wireless beacon 114, and sensors 116. In certain embodiments, controller 112 includes circuitry, an integrated circuit, or a processor operable to control operation of wireless beacon 114 and/or other components of circuit board 104 and/or POP display 102. Memory 110 may include many different types of memory known in the art for use on a circuit board. For example, memory 110 may be flash memory, RAM, EEROM, EEPROM, and/or one-time programmable memory.

In some embodiments, controller 112 is coupled to clock 113. Clock 113 may be capable of tracking both date and time. Clock 113 may be associated with wireless beacon 114 to provide time information (e.g., date and time) to the wireless beacon. In some embodiments, clock 113 is located in a chip on circuit board 104. In some embodiments, clock 113 is located in a microprocessor in wireless beacon 114.

In some embodiments, circuit board 104 includes unique label 117. Unique label 117 may be added during or after manufacturing of circuit board 104. Unique label 117 may be, for example, a printed label, such as a QR label or barcode, that can be viewed or electronically scanned for identifying information. Unique label 117 may include a unique identification for circuit board 104 that differentiates the circuit board from other circuit boards that may be used on other POP displays. For example, each circuit board 104 may have its own identification number that specifically identifies the circuit board.

Figure 1A:
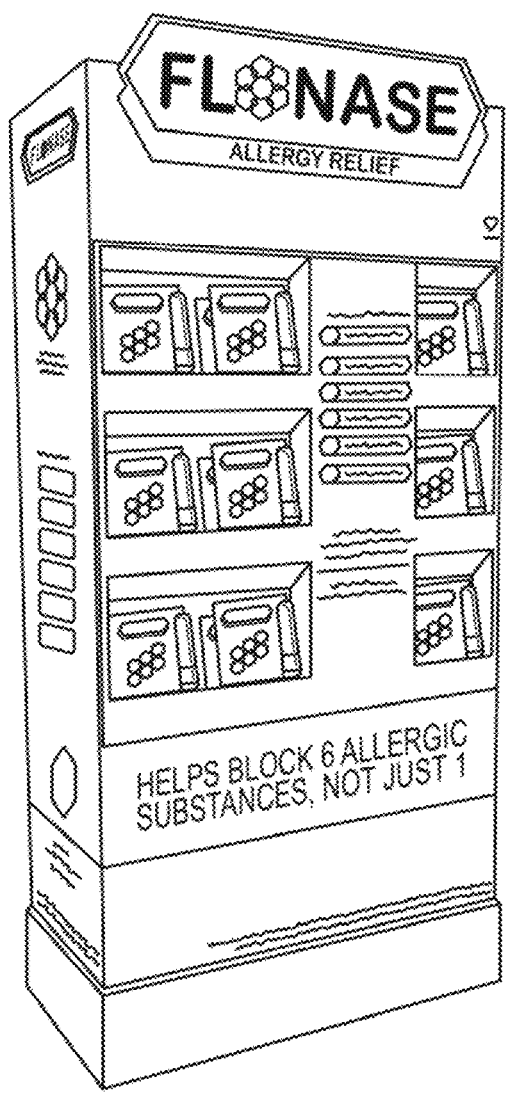
FIG. 1A depicts an example of an embodiment of a POP display.

POP display 102, as described herein, may be any display that holds products and/or advertises products. For example, POP display 102 may include signs, graphics, or other marketing materials that communicate information about a product to a consumer. FIG. 1A depicts an example of an embodiment of POP display 102. In some embodiments, POP display 102 includes the product itself. For example, products such as, but not limited to, demo units of electronic items, appliances, and/or rugs may be a POP display. POP display 102 is typically placed next to or near the merchandise the display is promoting and/or included as part of the merchandise. In some embodiments, POP display 102 is utilized to hold, support, or display products associated with the POP display. In certain embodiments, POP display 102 is a corrugated cardboard display. POP display 102 may also include displays made from materials such as, but not limited to, paper, paperboard, bristol board, foam cored board, plastic, or any other material suitable for holding and/or advertising products.

POP display 102 may be a component of a marketing or promotional campaign. In certain embodiments, POP display 102 is generally located in a retail environment (e.g., a retail store) or any other location where a customer purchases product or a decision to purchase product is made. In some embodiments, POP display 102 is placed in other display locations in order to drive potential customers to a specific area. For example, POP display 102 may be placed in a window display and used to provide (e.g., "beam")

promotional information to people as they pass by outside a retail store. Regardless of the location of POP display 102, the POP display may be intended to draw the customer's attention to products associated with the display. These products may, in some embodiments, be new products, products on sale, and/or products associated with a special offer. POP display 102 may also be used to promote special events (e.g., seasonal or holiday-time sales).

In certain embodiments, as shown in FIG. 1, POP system 100 includes the use of customer device 118. Customer device 118 may be, for example, a mobile device. Customer device 118 may be a small computing device, typically small enough to be handheld (and hence also commonly known as a handheld computer or simply handheld). Mobile devices may be any of various types of computer systems devices which are mobile or portable and which perform wireless communications using WLAN communication. Examples of mobile devices include mobile telephones or smart phones (e.g., iPhone™, Android™-based phones), and tablet computers such as iPad™, Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi. In certain embodiments, customer device 118 includes any device used by a customer with display 119 (e.g., an LCD screen or touchscreen), one or more wireless transceivers (e.g., wireless transceivers 120A, 120B, shown in FIG. 1), software package 122, and memory cache 124. Display 119, in some embodiments, includes a user interface for customer device 118 (e.g., the display allows interactive input for the user).

In certain embodiments, wireless beacon 114 on POP display 102 interacts with customer devices 118 carried by potential customers. Wireless beacon 114 may be configured to interact with customer devices 118 through wireless transceiver 120A. In certain embodiments, wireless transceiver 120A is a Bluetooth Low Energy ("BLE") transceiver.

In certain embodiments, wireless beacon 114 includes a unique identifier associated with the wireless beacon. The unique identifier may be broadcast by wireless beacon 114, received through wireless transceiver 120A, and used to identify the wireless beacon (e.g., the unique identifier may be used by a server to identify the wireless beacon as described herein). Thus, in embodiments with multiple wireless beacons 114, the wireless beacons broadcast their respective unique identifiers and the unique identifiers may be used to identify and/or differentiate the wireless beacons and, by extension, the circuit board and POP display associated with each wireless beacon.

Wireless beacon 114 may be a transponder sending data via radio signals. In certain embodiments, wireless beacon 114 is a Bluetooth Low Energy ("BLE") beacon. A Bluetooth LE beacon may operate in either peripheral or central mode, depending on the circumstances, though in certain embodiments, the beacon may default to peripheral mode. Chipsets implementing beacon functionality may be commercially available. Two non-limiting examples are the Texas Instruments CC2541 and CC2600. The disclosed embodiments, however, do not depend on the particular choice of Bluetooth chipset.

Bluetooth® low energy (Bluetooth LE, BLE®, also marketed as Bluetooth Smart) is a wireless personal area network technology designed and marketed by the Bluetooth Special Interest Group aimed at applications in the healthcare, fitness, beacons, security, and home entertainment industries. Compared to Classic Bluetooth, Bluetooth Smart is intended to provide considerably reduced power consumption and cost while maintaining a similar communication range.

Bluetooth Smart was originally introduced under the name Wibree by Nokia in 2006. It was merged into the main Bluetooth standard in 2010 with the adoption of the Bluetooth Core Specification Version 4.0. In certain embodiments, wireless beacons 114 are Bluetooth LE beacons. Bluetooth LE beacons may be used, at least in part, because Bluetooth LE has been widely adopted in customer devices 118 (e.g., mobile devices). Thus, a potential consumer may likely already have the requisite hardware to interact with circuit board 104 and POP display 102. For example, Bluetooth LE has been built into iPhones and iPads since 2010, and many Android devices since 2013. Bluetooth LE wireless beacons are also, as the name implies, energy efficient, which may be an important consideration for technology deployed on mobile devices. In certain embodiments, the positioning and data transmission capabilities of Bluetooth LE are also of use, though the embodiments disclosed herein may also be implemented using other wireless standards, including the various versions of IEEE 802.11.

In certain embodiments, POP display system 100 includes server 126. Server 126 may communicate with customer device 118 through wireless transceiver 120B on the customer device. In certain embodiments, wireless transceiver 120B is a Wi-Fi-enabled or cellular transceiver. Server 126 may include content 128. In certain embodiments, content 128 is uploaded to server 126 via an exposed API (Application Programming Interface). Content 128 may be included as part of a storage structure or storage management system (e.g., a database) accessible by server 126. For example, content 128 may be stored in a database in an accessible memory of server 126. In certain embodiments, content 128 includes information that corresponds to advertising, marketing, and/or promotional campaigns associated with POP displays 102. For example, content 128 may include, but not be limited, campaign start times, campaign time periods, campaign locations, coupons associated with the campaign, advertising and/or marketing associated with the campaign, and promotions associated with the campaign.

As server 126 includes content 128, the server may be referred to as a "content server", though the phrase "content server" as used in this disclosure should not be considered strictly limiting. In some embodiments, the physical server (s) (e.g., server 126) that stores content 128 may perform other functionality and/or work in conjunction with other servers to enable some or all of its functionality. For example, server 126 may work with a load balancing server to optimize its communications load over a network or authentication servers to validate the entities requesting a download of content. In some embodiments, server 126 may operate in a distributed nature such that content 128 is distributed over more than one physical storage device or logical drive partitions. The term "content server" is intended to encompass all of these scenarios and any other that one of ordinary skill in the art would contemplate in implementing the disclosed functionality.

In certain embodiments, server 126 includes information 130. Information 130 may be included as part of a storage structure or storage management system (e.g., a database) accessible by server 126. Information 130 may include information regarding POP display 102 and wireless beacon 114 such as, but not limited to, the unique identifier, location information (if known), and retail location information for the POP display (e.g., store location information for a specific retailer associated with the POP display). In some embodiments, information 130 includes information recorded from sensors 116 and/or other components on POP displays 102 as well as information recorded on customer devices 118 that is transmitted to server 126.

In certain embodiments, SDK ("Software Developer Kit") 125 is located in software package 122 on customer device 118, as shown in FIG. 1. SDK 125 may allow programmers to develop applications (e.g., mobile application 127) for customer device 118 that interface the customer device with server 126 and circuit board 104. SDK 125 may abstract low level implementation details of POP display system 100 and simplify the development of software applications compatible with the disclosed embodiments. In certain embodiments, SDK 125 includes functionality to facilitate accessing APIs exposed by server 126 (e.g., the content server) as well as wireless (e.g., Bluetooth) mediated interactions with wireless beacons 114.

In certain embodiments, mobile application 127 is located in software package 122 on customer device 118. Mobile application 127 may be coupled to SDK to allow the mobile application to interface and utilize functions of the SDK. In some embodiments, SDK 125 may be embedded in mobile application 127 (e.g., the SDK is a software code element of the mobile application). Mobile application 127 may be, in some embodiments, a retailer "app" or other mobile application written for interaction between a customer and a specific retailer (e.g., the mobile application may be a customer loyalty app specific for a selected retailer). In certain embodiments, mobile application 127 provides an interactive interface for the customer through customer device 118. For example, mobile application 127 may use display 119 as a user interface (the display is a touchscreen) to allow interactive customer input or the mobile application may use the display in combination with another input system (e.g., a keyboard or voice input) to allow interactive customer input. In certain embodiments, mobile application 127 utilizes SDK 125, when run on customer device 118, to detect that the customer device is in proximity to a compatible Bluetooth LE beacon (e.g., wireless beacon 114), as described herein.

In certain embodiments, SDK 125 is configured to receive measurements from customer device 118 through built-in features of the customer device. For example, SDK 125 may receive measurements from accelerometer, gyroscope, compass, audio, light, or Near Field Communication measurements on customer device 118. These measurements may be utilized to increase the accuracy of calculated location information or used to infer additional information about either a user or an environment of POP display 102. For example, information from an accelerometer on customer device 118 may be combined with other information to increase the accuracy of detection of "bumps" or recognition of gestures as described below.

In some embodiments, the measurements received by SDK 125 are sent to server 126 and stored in information 130. Server 126 may integrate the measurement information from customer device 118 to increase accuracy of location information and/or infer additional information, as described below. In some embodiments, server 126 may integrate the measurement information with information from external data sources, which may be located in information 130 on the server. For example, server 126 may integrate store specific information from nearby beacons, geolocation information provided by a retail loyalty application on connected mobile devices, or other information received from third party sources.

In certain embodiments, POP display system 100 utilizes wireless signal strength to infer distance between customer device 118 and POP display 102. POP display system 100 may utilize this distance information to modulate and/or control the particular information conveyed to the customer through customer device 118. In certain embodiments, SDK 125 in software 122 on customer device 118 receives information, based on distance, indicating the detection of "bumps" or "pulls" (e.g., when a user physically touches (or very nearly so) the customer device against a designated area of POP display 102 (e.g., at or near a "tap device here for more information" designated area)). In the disclosed embodiments, the concept of bumping is applied as a way for a user to express interest in POP display 102 independent of any technical requirements of the underlying wireless communication protocol being used.

Various techniques may be utilized to estimate distance between customer device 118 and POP display 102. For example, in certain embodiments, Received Signal Strength Indication ("RSSI") values of Bluetooth signals are measured and analyzed to infer distance. The distance inferred may be relative or absolute in nature (e.g., the technique may only specify a distance from POP display 102 as opposed to exact position). By means of illustration, the general relationship between RSSI value and distance is approximately $RSSI[dbm]=-(10 \times n \times \log 10(d)-A)$, where d is the distance and A is the offset which is the measured RSSI value 1 meter point away from the Bluetooth LE device. Again, this is provided simply for illustrative purposes and other relationships and formulas may be utilized by the disclosed embodiments to infer location information about the customer device and, by extension the customer. Other examples of values that may be utilized to determine signal strength include, but are not limited to, packet loss ratio or rate, header error check, cyclic redundancy check, and forward error correction. Furthermore, the measurement of these various values, including RSSI, may be implemented in numerous ways in hardware. For example, one may utilize Goertzel algorithms to derive signal strength values from a series of transceiver power measurements. As shown above, the precise implementation details of the measurement to calculate location information can vary and the embodiments disclosed herein may be suited to the usage of any measurement to calculate location information. Furthermore, location related information (e.g., signal strength measurements, values derived from signal strength measurements, identifiers associated with a particular mobile device, timestamps associated with a signal strength reading) may be saved to a memory (e.g., memory 110 or memory cache 124) for future review and/or analysis. In some embodiments, the location related information includes information about customer device 118. For example, the information may include information about chipsets, antennas, and/or an operating system of customer device 118. The information about customer device 118 may be part of the future review and/or analysis to increase accuracy in assessing relative location information of the customer device and POP display 102.

In certain embodiments, signal strength (e.g., Bluetooth signal strength as measured, for example, via RSSI) between POP display 102's wireless beacon 114 and wireless transceiver 120A on customer device 118 is monitored and, if it surpasses a predefined threshold or "trigger" level, it is inferred that the customer has "bumped" the customer device against the POP display and has made a "pull" delivery request (e.g., the user has indicated his/her intention to receive or "pull" content associated with the POP display). In certain embodiments, the predefined threshold is set at a signal strength level that indicates that the user has clearly intended to initiate a "bump" or "pull" with POP display 102. For example, the predefined threshold may be set at a signal strength level that clearly defines customer device 118 has intentionally been placed on or near to the designated area of POP display 102 by the customer. In some embodiments, the predefined threshold is combined with other information (e.g., information from an accelerometer on customer device 118) to define intent of the customer in "pulling" for content. For example, accelerometer data may be combined with the predefined threshold (measured via RSSI) to recognize a gesture (e.g., movement of customer device 118 in an intentional way) made by the user that indicates intent of the customer to receive information.

In certain embodiments, the predefined threshold improves the reliability of bump detection and the threshold may be dynamic in nature. For example, the threshold may be specified by a formula that accounts for certain variables rather than a set static number. In some embodiments, the algorithm may not allow a new bump to be registered until the signal is outside of a separate threshold, usually higher in value than the entrance threshold. This restriction may help to prevent spurious bumps. Additional techniques may be utilized to improve bump detection (such as a filter to smooth RSSI values). In some embodiments, signal profiles for setting the predefined threshold are associated with a type of customer device 118 (e.g., a type of mobile device or a type of antenna used in the mobile device). Server 126 may receive type data for customer device 118 when the customer device is in contact with the server. Server 126 then may send RSSI signal profiles associated with the type data to the SDK on customer device 118, which stores the signal profiles in memory cache 124 for accessing in assessment of bump indications.

Some embodiments may utilize different methods for gauging distance. For example, other performance measures associated with a Bluetooth signal, RSSI values associated with a 802.11 Wi-Fi signal, information from a Near Field Communication signal, etc. may be used. Regardless of the origin and type of information used, the associated algorithms may utilize the information to detect bumps. In some embodiments, the detection of bumps is performed in circuit board 104 rather than on customer device 118.

Bumping may be used to signal that the customer is explicitly requesting digital content (e.g., requesting content to be display on display 119 of customer device 118). In the event that a bump is detected, the SDK may provide content to the customer on customer device 118 (this may be referred to as "pull" delivery). For example, content may be display on display 119 through mobile application 127. The content may include content stored in memory cache 124, which includes content 128 previously received from server 126 as described herein. Conversely, "push" delivery may occur in the absence of a bump, where content 128 may be delivered by server 126 to customers that have not explicitly requested content. In certain embodiments, unsolicited push content is throttled to prevent from overloading the customer with unrequested content, while pull content (e.g., requested content) is not throttled. In some embodiments, the exact throttling scheme used is configurable by software and may be specified by various entities. For example, the exact throttling scheme may be specified by a POP display owner, a retailer, an advertising company, a manufacturer of goods or services associated with the POP display, etc.

In some embodiments, a throttling scheme is personalized for a particular user. For example, the throttling scheme may include personalized data based on a persona of the user. The personalized data may be uploaded to and/or stored in memory cache 124 on customer device 118. The persona of the user may include categories based on one or more user preferences. The preferences may be for categories that include non-specific information about the user (e.g., anonymous information based only on the behavior of the user). Using non-specific information may protect privacy and security of the user of customer device 118. In some embodiments, the persona of the user is defined by preferences specified by a retailer (e.g., through a retailer app in SDK 125 on customer device 118).

Information relevant to the throttling scheme may be incorporated in several aspects of the disclosed embodiments. First, content 128 may be uploaded to server 126 via an exposed API (Application Program Interface) designed to work with the overall device ecosystem. This API requires that the uploaded content be associated with information that allows server 126 to associate content 128 with specific beacons (e.g., wireless beacon 114). The API may also require information associated with the uploaded content that will allow customer device 118, via an API call, to determine if the content should be served up based on push or pull.

In certain embodiments, as shown in FIG. 1, POP display 102 includes sensors 116. Sensors 116 may provide monitoring of activity in and/or around the POP display. In certain embodiments, sensors 116 include proximity sensors that detect activity in the vicinity of POP display 102. Proximity sensor may detect activity based on, for example, heat, light (reflected infrared and/or visible light), sound, and/or images. Examples of sensors 116 include, but are not limited to, ambient light sensors, passive infrared sensors, active infrared sensors, and image based detection sensors. Other examples include accelerometers, temperature sensors, weight sensors, cameras, and sensors that detect when a product has been dispensed or when a display needs to be restocked.

Sensors 116 may be used to measure and record (and, in some embodiments, timestamp in combination with clock 113) activity around the display and save these measurements in memory 110. These measurements and recordings may provide information that can be used for detailed analysis of the level of traffic around POP display 102 by time. The analysis may include determining information such as, but not limited to, how many people walk past the display, how many people stop to look at the display, when a door is opened, how long the door is opened, and whether products are removed. Such analysis may include measuring the timing of the activity, such as how long a potential customer stood in front of the display, commonly referred to as dwell time. Other potential analyses include, but are not limited to, how many shoppers passed by (divided into buckets of time), the average dwell time per shopper, and/or counts of shoppers that had smartphones (customer devices 118) equipped with software package 122. Measurement data from sensors 116 stored in memory 110 may be transmitted (broadcast) in data packets sent out by wireless beacon 114. The data packets with the measurement data may be received by, for example, customer devices 118 and/or network gateway 710 to then be transmitted to a remote server (e.g., server 126).

In certain embodiments, sensors 116 include a proximity sensor that monitors activity only within a defined range (e.g., a defined distance) from POP display 102. Sensor data may also be used in a transmission throttling scheme as described herein (e.g., a particularly crowded store might dictate the use of a different transmission). Additionally, as described herein, the connection between wireless beacons 114 and/or customer devices 118 may be utilized to share information between POP displays 102.

In certain embodiments, information recorded from sensors 116 and/or other components on POP displays 102 as well as information recorded on customer devices 118 is transmitted and stored in server 126 as information 130. Information recorded on customer devices 118 may include any information or data relating to interactions between the customer devices and wireless beacons 114, interactions between the customer devices and server 126, other interactions involving the customer devices, and data obtained by the customer devices such as device sensor data (e.g., position and/or movement measurement data) and/or application data from the software package. In some embodiments, recorded information may be stored in memory cache 124 on customer device 118 before being transmitted to server 126. The recorded information stored in memory cache 124 may include information recorded on customer device and/or information recorded from sensors 116 on POP displays 102 (after the data is transmitted to the customer device via wireless beacon 114). In some embodiments, proximity sensor data is used by server 126 along with position information obtained through wireless transceiver 120B on customer device 118 to improve the accuracy of determining location information (e.g., location information related to location of wireless beacons and POP displays).

In certain embodiments, it may be desirable to only allow wireless beacons to broadcast when there is activity near the wireless beacon. Allowing wireless beacons to only broadcast with nearby activity may allow a large number (e.g., high density) of wireless beacons to be located in a single retail location as not all of the wireless beacons will be actively broadcasting at the same time. In certain embodiments, one or more sensors 116 are used in combination with wireless beacon 114 to allow the wireless beacon to operate in a low power (non-broadcasting) mode while located in a retail location and only actively broadcast when nearby activity is detected. For example, sensor 116 may be a proximity sensor that detects activity within a selected distance from wireless beacon 114. When no activity is detected by sensor 116 (e.g., there is an absence of activity), wireless beacon 114 may enter a low power (sleep or non-broadcasting) mode. In the low power mode, wireless beacon 114 does not respond or provide push/pull events, described herein, as the wireless beacon is not broadcasting any data packets. If sensor 116 detects any activity (e.g., via proximity detection of a customer/user), wireless beacon 114 may be switched to an active (broadcasting) mode substantially instantaneously. Wireless beacon 114 may then be active for any push/pull events or content requests associated with customer device 118.

In some embodiments, POP display 102 includes other sensors 116 that provide additional measurements. For example, sensors 116 may include an accelerometer that is used to detect when product is added or removed from POP display 102. As another example, POP display 102 may be mounted on a door such as a freezer case door found in a grocery store. The accelerometer on POP display 102 may be used to detect when the door is opened and closed. This information may be correlated with other information to determine, for example, how many people walk past the display, how many people stop to look at the display, how long a person looks at items displayed in the freezer before opening the door, how long the door is opened, and whether products are removed from the freezer. Yet another example is a light sensor may be used to determine when the display was unpacked and when the store is opened or closed (as described below, this may be used to determine the actual deployment rate for a set of POP displays). Many POP displays are never deployed and the use of sensors 116 may allow tracking of POP display deployment and addressing such deployment issues based on the deployment information collected.

Figure 2:
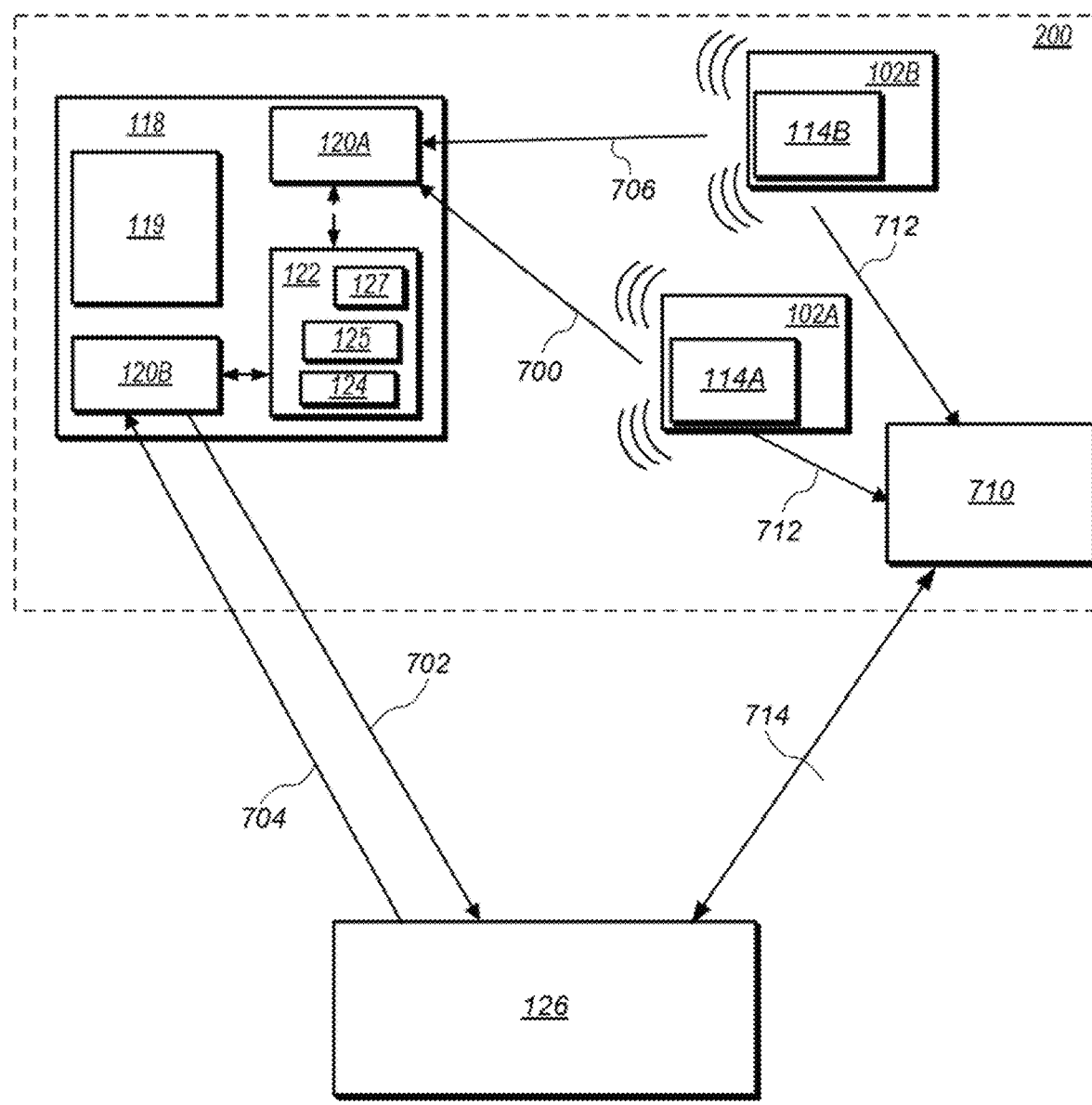
FIG. 2 depicts a block diagram representation of an embodiment of an interaction between a customer device, wireless beacons, and a server.

FIG. 2 depicts a block diagram representation of an embodiment of an interaction between customer device 118, wireless beacons 114, and server 126. In certain embodiments, customer device 118 receives first Bluetooth LE packet 700 from first wireless beacon 114A. First wireless beacon 114A may be, for example, a wireless beacon located at or near a retail entrance (e.g., a store entrance). In certain embodiments, first wireless beacon 114A is located in an area where customer device 118 is able to communicate with server 126 (e.g., the customer device has wireless connectivity (either through Wi-Fi or cellular transmission with the server). Upon receipt of first Bluetooth LE packet 700, SDK 125 may inspect memory cache 124 and determine if the memory cache contains up-to-date data (content) for first wireless beacon 114A. If the content is not up-to-date in memory cache 124, then SDK may contact 702 server 126 (e.g., the content server) and retrieve 704 the latest content (e.g., content 128) associated with first wireless beacon 114A. The retrieved content may be stored in memory cache 124.

In some embodiments, server 126 may be aware of the location of first wireless beacon 114A and/or other wireless beacons (identifiable by their unique identifiers) associated with the first wireless beacon. The other wireless beacons (e.g., second wireless beacons 114B, shown in FIG. 2) may be other wireless beacons that are nearby first wireless beacon 114A. In certain embodiments, second wireless beacons 114B are wireless beacons that are located in the same store as, or in proximity to, first wireless beacon 114A. In some embodiments, second wireless beacons 114B are wireless beacons in other stores at other locations that are associated with the particular venue of first wireless beacon 114A (e.g., the beacons are associated with a single retail chain).

Knowing the association between first wireless beacon 114A and second wireless beacons 114B, server 126 may, therefore, transmit the latest content for the second wireless beacons in addition to transmitting the latest content for the first wireless beacon. The content for both first wireless beacon 114A and second wireless beacons 114B may be stored in memory cache 124. Transmitting the latest data for second wireless beacons 114B may improve customer device 118 user's experience as information for each subsequent wireless beacon encountered may already be on the customer device and accessed immediately as the subsequent beacons are encountered (e.g., when SDK 125 receives second Bluetooth LE packet 706 from the second wireless beacons). This may be particularly advantageous in areas where there is limited or no data connectivity (e.g., where it would otherwise be impossible to download the content associated with a newly encountered wireless beacon). For example, when customer device 118 enters a store and detects first wireless beacon 114A, the customer device may automatically download the latest content associated with all second wireless beacons 114B in the store and store the content in memory cache 124 rather than incrementally downloading content as the customer device encounters each second wireless beacon. Incremental downloading may be slower and/or may not be possible as one wanders deeper into a physical structure and customer device 118 loses wireless network connectivity (e.g., enters cellular deadspots within the structure). Again, SDK 125 manages this functionality and, from the perspective of mobile application 127, the SDK notifies the mobile application of push and pull events (described herein) as well as delivering any associated content from memory cache 124 to the mobile application. Mobile application 127 may then display content from memory cache 124 to the customer on display 119. FIGS. 3A-3K depict examples of content being displayed on display 119. In some embodiments, display 119 allows the customer to interact with content displayed by mobile application 127 (e.g., the content may include a menu of options for selection by the customer).

An additional advantage of SDK 125 is that the SDK may transmit to server 126 location information available from customer device 118 about the customer device's location along with the unique identifier received from wireless beacon 114. In some embodiments, the location information is sent to server 126 when a request for content is made from the server. In certain embodiments, location information about the location of customer device 118 includes GPS data (such as latitude/longitude data) from the customer device (e.g., using built-in GPS on the customer device). In some embodiments, location information about the location of customer device 118 includes detected Wi-Fi networks (e.g., Wi-Fi networks accessed by the customer device). In some embodiments, mobile application 127 provides SDK 125 with the location of customer device 118 (e.g., the mobile application may tell the SDK which store associated with the mobile application at which the customer device is located). The location information of customer device 118 along with the unique identifier from wireless beacon 114 may allow server 126 to identify the physical or retail location (e.g., a specific store number for a retail chain) of the wireless beacon having the unique identifier.

Figure 4:
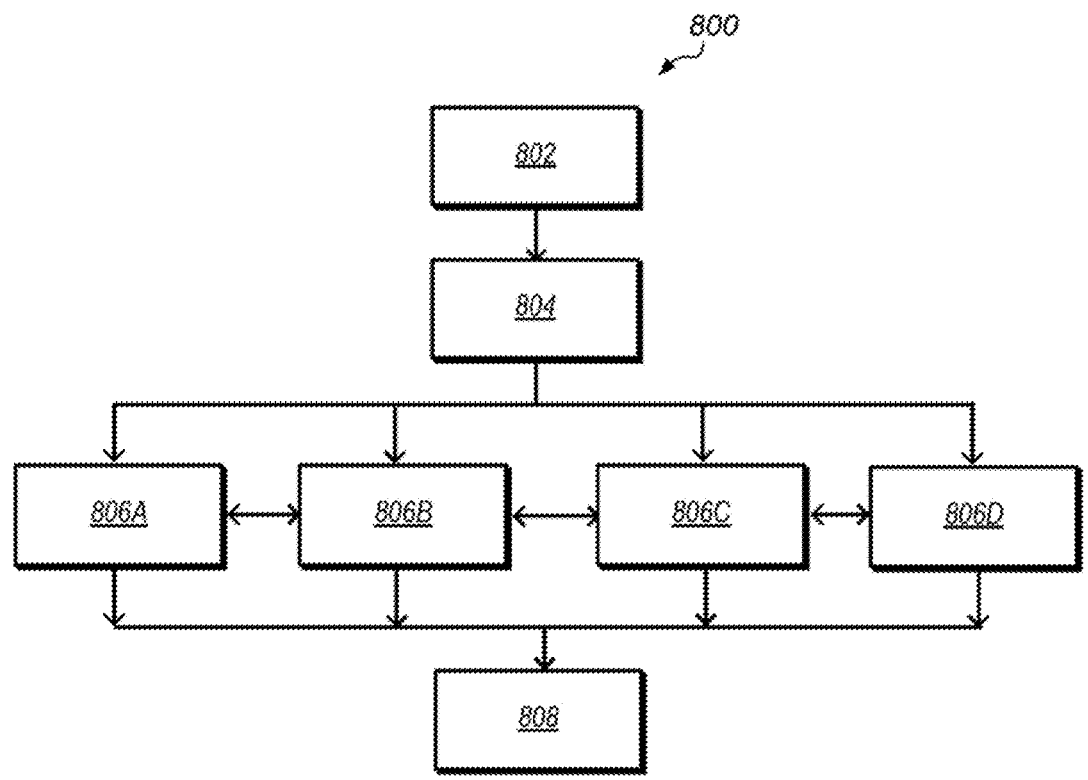
FIG. 4 depicts a flowchart of an embodiment of a method to assess a location of a wireless beacon and its POP display.

FIG. 4 depicts a flowchart of an embodiment of method 800. Method 800 may be used to assess a location of wireless beacon 114 and POP display 102. In 802, a plurality of POP displays 102 and their wireless beacons 114 may be associated with a selected campaign. As described herein, a "campaign" refers to an advertising, a marketing, or a promotional campaign associated with a particular retail product or a grouping of products associated with one campaign. For example, the campaign may be a special sale for a limited time for the particular retail product. In some embodiments, the campaign is associated with specific retailers, specific stores within a retail chain, and/or specific geographic locations. In some embodiments, the campaign has a selected time period associated with the campaign (e.g., the campaign is active for a selected amount of time).

In some embodiments, associating wireless beacons 114 with the selected campaign in 802 includes associating the wireless beacons with a selected campaign associated with a specific retailer. For example, wireless beacons 114 may be designated for a specific advertising campaign intended for a specific retailer. In 804, the wireless beacons may be randomly distributed to a plurality of retail locations. Even though the selected campaign may be known for wireless beacons 114, the exact final location of POP displays 102 with the wireless beacons is typically unknown (as described below for step 314 in FIG. 9). Thus, each of the retail locations that receive the randomly distributed POP displays 102 may be associated with the same selected campaign.

After POP displays 102, along with wireless beacons 114, are placed at their intended locations and the wireless beacons are activated (e.g., activated at either their final display location or a temporary storage location such as a store back (or storage) area), one or more different methods may be used to assess a retail location of each of the POP displays (e.g., the store at which each POP display is located). For example, as shown in FIG. 4, method 806A, method 806B, method 806C, and method 806D may each be used, either alone or in combination, to, in 808, assess the retail location of a selected POP display 102 and wireless beacon 114. Methods 806A, 806B, 806C, 806D may be used to assess the retail location of multiple POP displays 102. In some embodiments, one method may be used to assess the retail location of all the POP displays associated with the selected campaign. In some embodiments, one method may be used to assess the retail location of a first POP display while another method is used to assess the retail location of a second POP display, a third POP display, a fourth POP display, etc.

Figure 5:
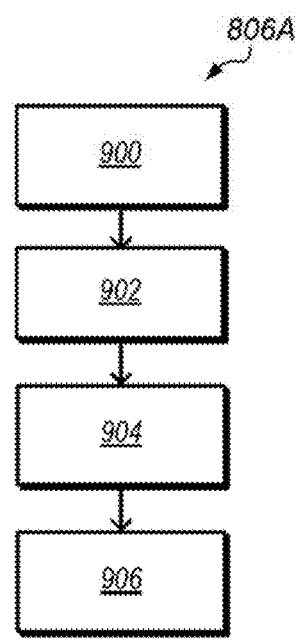
FIG. 5 depicts a flowchart of an embodiment of a method used to assess a location of a POP display.

FIG. 5 depicts a flowchart of an embodiment of method 806A used to assess a location of a POP display. Once POP display 102 is placed at a retail location (e.g., in 804, shown in FIG. 4), method 806A may be used to assess the retail location of the POP display using interaction with customer device 118 and SDK 125 on the customer device. In 900, customer device 118 may receive a packet (e.g., a data packet such as packet 700, shown in FIG. 2) from wireless beacon 114. The packet may include the unique identifier for wireless beacon 114.

In 902, SDK 125 may combine the received unique identifier along with geographic information on the location of customer device 118. For example, the geographic information may include the geographic location of customer device 118 such as, but not limited to, latitude and longitude location or GPS location of the customer device. In 904, SDK 125 may then provide the geographic location of customer device 118 along with the unique identifier to a remote server (e.g., server 126, shown in FIGS. 1 and 2). In some embodiments, a time stamp from customer device 118 is also provided to the remote server. In certain embodiments, SDK 125 provides unique identifiers for a plurality of wireless beacons along with the geographic location of customer device 118.

In 906, the remote server may then assess or determine the retail location of wireless beacon 114 with the unique identifier using the geographic location information provided along with the unique identifier. If multiple unique identifiers are sent to the remote server, the remote server may determine the retail location of each of the wireless beacons with the unique identifiers associated with the geographic location information. The determined retail location may be, for example, a retail store number associated with a retail chain associated with the selected campaign. In some embodiments, the retail location is determined using the geographic location in combination with other information available to the remote server, including, but not limited to, information from other customer devices and/or information about retail locations associated with the selected campaign. In some embodiments, the remote server assesses the time stamp received from SDK 125 in combination with the geographic location of customer device 118, the unique identifier, and the retail locations associated with the selected campaign. Assessing the time stamp may allow the remote server to assess if the POP display is active during a selected time period associated with the selected campaign for the POP display.

Information from other customer devices may include, but not be limited to, geographic location information from interaction of other customer devices with the wireless beacon. Thus, in some embodiments, the remote server may use information from multiple customer devices to determine the retail location of a wireless beacon. The information about retail locations associated with the selected campaign may be provided to the remote server or obtainable by the remote server using information input earlier about the selected campaign. In some embodiments, the remote server stores the retail location information along with the unique identifier in a database (e.g., information 130 on server 126, shown in FIG. 1).

The retail location determined in 906 may be provided to method 800, shown in FIG. 4, to either be used as the assessed retail location in 808 or used in other methods (e.g., 806B or 806C) to determine the retail locations of other POP displays. In some embodiments, the retail location determined in 906 may be used to assess if the location of the POP display and the wireless beacon has changed. For example, the remote server may look up the unique identifier and assess if a previous location for the unique identifier was recorded to assess if any change in location has occurred.

Figure 6:
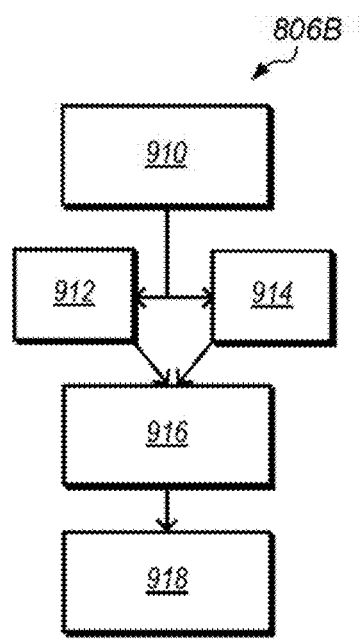
FIG. 6 depicts a flowchart of a second embodiment of a method used to assess a location of a POP display.

FIG. 6 depicts a flowchart of an embodiment of method 806B used to assess a location of a POP display. Method 806B may include assessing the retail location of POP display 102 and wireless beacon 114 using the presence of other detected wireless beacons (POP displays) with known retail locations in proximity to the wireless beacon and interaction with one or more customer devices 118. In some embodiments, multiple wireless beacons are interacting with a single customer device 118 (e.g., the single customer device receives packets from multiple wireless beacons at or around the same time). In some embodiments, the wireless beacons are interacting with multiple customer devices 118 at or around the same time with a remote server receiving information from the multiple customer devices (with knowledge of the customer devices being at the same location).

As shown in FIG. 6, method 806B includes determining, at the remote server, a retail location of a first POP display in 910. The retail location of the first POP display may be determined, for example, using method 806A, shown in FIG. 5, method 806C, shown in FIG. 7, or method 806D, shown in FIG. 8. Determining the retail location of the first POP display in 910, as shown in FIG. 6, allows the remote server to know the retail location of the first POP display. In some embodiments, the retail location of the first POP display may be known and provided to the remote server in 910 (e.g., a separate entity or application provides the retail location of the first POP display or the retail location the first POP display is to be sent to is known before being sent to the location). In some embodiments, the same retail location is determined (and then known) for multiple POP displays in 910 (e.g., the same retail location may be determined (and then known) for two or more POP displays). The remote server may associate together the multiple POP displays at the same retail location.

After the location of the first POP display(s) is determined (or known) in 910, customer device 118 may receive a first data packet (or a set of first data packets for multiple POP displays) with the unique identifier for the first POP display (s) in 912. At or around the same time, customer device 118 may receive a second data packet from a second POP display in 914. The second POP display may have a retail location that is unknown to the remote server. The second data packet may include the unique identifier for the second POP display.

In 916, SDK 125 on customer device 118 may provide the unique identifier for the first POP display(s) and the unique identifier for the second POP display to the remote server (e.g., server 126, shown in FIGS. 1 and 2). In 918, the remote server may determine, based on the remote server receiving both the unique identifier for the first POP display (s) and the unique identifier for the second POP display at the same time, that the second POP display is at the same retail location as the first POP display(s). Put another way, the remote server determines that the second POP display is at the same retail location as the first POP display(s) because the remote server receives both unique identifiers from the same customer device, which is at the retail location. The retail location of the second POP display determined in 918 may be provided to method 800, shown in FIG. 4, to be used as the assessed retail location in 808.

In some embodiments, the remote server may receive the unique identifier for the first POP display(s) and the unique identifier for the second POP display from different customer devices in 916 (e.g., two or more different mobile devices). In such embodiments, however, the remote server may receive other identifying information (e.g., geographic location information or specific content related information) that allows the remote server to associate the unique identifier for the first POP display(s) with the unique identifier for the second POP display and determine that the POP displays are at the same retail location in 918.

Figure 7:
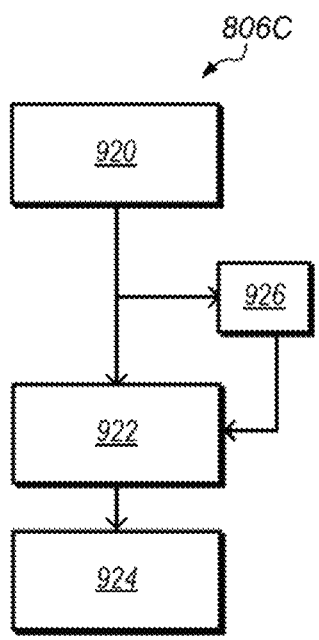
FIG. 7 depicts a flowchart of a third embodiment of a method used to assess a location of a POP display.

FIG. 7 depicts a flowchart of an embodiment of method 806C used to assess a location of a POP display. Method 806C may include assessing the retail location of POP display 102 and wireless beacon 114 using communication with a network gateway located at the retail location. In certain embodiments, as shown in FIG. 2, network gateway 710 is located at retail location 200. Multiple network gateways 710 may be installed at known retail locations for interfacing with POP displays after the POP displays are distributed and reach the retail location. For example, network gateways 710 may be permanent network gateways installed at each retail location in a retail chain or supply chain with the location of each network gateway being known. Thus, for POP display distribution, the retail locations of multiple network gateways 710 are known by the remote server.

Network gateway 710 may be a wireless network gateway. For example, network gateway 710 may be any hardware (e.g., a processor and one or more wireless antenna) capable of networked communication over one or more wireless communication networks and/or interfacing between wireless communication networks (e.g., interfacing between a local area network (LAN) and a wide area network (WAN)). Communication networks may include, but not be limited to, WANs cellular networks, wireless networks, and the Internet. In certain embodiments, network gateway 710 is connected to the Internet and is capable of interfacing and communicating using Bluetooth LE, Wi-Fi, sub-gigahertz radio, cellular, and other longer-range radio bands.

In embodiments with network gateway 710 using sub-gigahertz radio, wireless beacons 114 may be capable of broadcasting over sub-gigahertz (or another longer-range radio band) in addition to Bluetooth LE. Sub-gigahertz broadcasting may provide increased range of data transmission as compared to Bluetooth LE (e.g., sub-gigahertz may have a transmission range of up to about a mile). Sub-gigahertz broadcasting may include, for example, broadcasting over the ISM band (UHF). In some embodiments, however, other longer broadcast range (and detection range) radio bands may be used instead of sub-gigahertz radio bands. For example, broadcast radio bands such as, but not limited to, Wi-Fi, LORA, or ZigBee may be used in wireless beacons 114 and/or network gateway 710. In certain embodiments, wireless beacons 114 are equipped with a communication chip (e.g., wireless transceiver 120A) capable of both Bluetooth LE and sub-gigahertz broadcasting (or another longer-range radio band). While Bluetooth LE may be used for broadcasting to mobile devices (or other Bluetooth LE capable devices), a larger LAN may be provided between wireless beacons 114 and network gateway 710 by using the longer broadcast range provided by sub-gigahertz radio (or another longer-range radio band). In some embodiments, network gateway 710 may provide a data collection network (e.g., a LAN for data collection) for collecting data broadcast 712 by wireless beacons 114 (e.g., unique identifiers, sensor data, etc.) and transmitting the data over a communication network 714 (e.g., a WAN connected to the remote server).

In certain embodiments, as shown in FIG. 7, method 806C includes a network gateway (e.g., network gateway 710) at a known retail location (e.g., retail location 200) receiving a data packet (e.g., data broadcast 712) from wireless beacon 114 on POP display 102 in 920. The data packet may include the unique identifier of the wireless beacon and the POP display. The network gateway may provide the unique identifier to the remote server in response to receiving the data packet in 922. In some embodiments, the network gateway provides the unique identifier to the remote server over communication network 714 (e.g., cellular network, Wi-Fi network, or the Internet). In some embodiments, the network gateway provides the unique identifier to the remote server using customer device 118. For example, the network gateway provides the unique identifier along with identifying/location information about the network gateway to SDK 125 on customer device 118. SDK 125 may then provide this information to the remote server when customer device 118 communicates with the remote server.

In 924, the remote server may associate the POP display having the unique identifier with the network gateway providing the unique identifier and the retail location of the network gateway. Using this association, the remote server may determine the retail location of the POP display with the unique identifier because the retail location of the associated network gateway is known (e.g., the installation location of the network gateway is known as described above). In some embodiments, the network gateway associates the POP display having the unique identifier with the retail location of the network gateway and provides data about the association to the remote server, which then stores information about the retail location of the POP display. The retail location of the POP display having the unique identifier determined in 924 may be provided to method 800, shown in FIG. 4, to be used as the assessed retail location in 808.

In some embodiments, method 806C includes assessing a signal strength between the POP display with the unique identifier and the network gateway in 926. The assessed signal strength may be provided to the remote server along with the unique identifier in 922. The remote server may use the assessed signal strength to determine a specific (or relatively specific) location of the POP display within the retail location. For example, the exact location of the network gateway at the retail location may be known (e.g., in a server room at the retail location). The assessed signal strength may provide information that is used to estimate the distance between the POP display with the unique identifier and the network gateway. From the estimated distance, the specific location of the POP display within the retail location may be determined (e.g., estimated or approximated).

Figure 8:
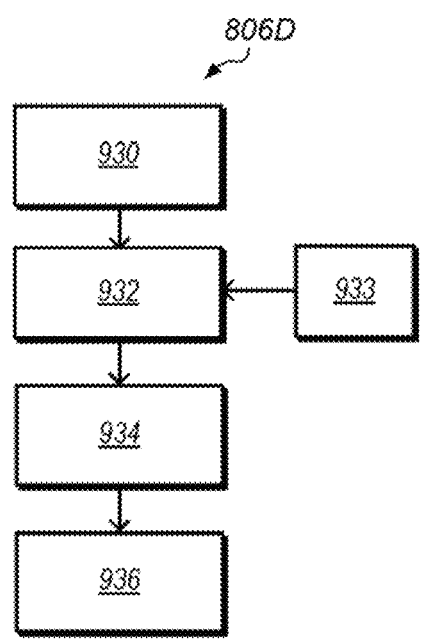
FIG. 8 depicts a flowchart of a fourth embodiment of a method used to assess a location of a POP display.

FIG. 8 depicts a flowchart of an embodiment of method 806D used to assess a location of a POP display. Method 806D may be used to assess the retail location of the POP display using interaction with customer device 118 and SDK 125 on the customer device. In 930, customer device 118 may receive a packet (e.g., a data packet such as packet 700, shown in FIG. 2) from wireless beacon 114. The packet may include the unique identifier for wireless beacon 114. In some embodiments, customer device 118 may receive multiple packets from multiple wireless beacons, each packet having the unique identifier for the originating wireless beacon.

In 932, SDK 125 may combine the received unique identifier along with information about the retail location of customer device 118 from 933. In certain embodiments, the retail location of customer device 118 in 933 is provided by another application (or entity) located on the customer device. For example, mobile application 127 (located in software package 122 on customer device 118, as shown in FIG. 1) may provide the retail location of the customer device. The manner in which mobile application 127 determines the retail location of customer device 118 may be unknown to SDK 125. For example, mobile application 127 may be a retailer "app" that determines the retail location (e.g., store number) of customer device 118 through an unknown or proprietary algorithm. Regardless of the manner in which mobile application 127 determines the retail location of customer device 118, SDK 125 may receive the retail location known by the mobile application in 933 and combine this information with the unique identifiers for the wireless beacons.

In 934, SDK 125 may then provide the retail location of customer device 118 along with the unique identifier to the remote server. In some embodiments, a time stamp from customer device 118 is also provided to the remote server. In certain embodiments, SDK 125 provides unique identifiers for a plurality of wireless beacons along with the retail location of customer device 118.

In 936, the remote server may assess or determine the (selected) retail location of wireless beacon 114 with the unique identifier by associating the wireless beacon with the provided retail location of customer device 118. If multiple unique identifiers are sent to the remote server, the remote server may determine the retail location of each of the wireless beacons with the unique identifiers by associating the retail location of customer device 118 with each wireless beacon. The retail location of the POP display determined in 936 (the POP display having the wireless beacon with the unique identifier) may be provided to method 800, shown in FIG. 4, to be used as the assessed retail location in 808.

Identification of the retail location of wireless beacon 114 by server 126 through the interaction of the wireless beacon with customer device 118 allows the wireless beacon's location to be dynamically cataloged by the server and potentially other portions of the overall system, including the wireless beacon itself. Identification of the retail location by server 126 may be advantageous in that it does not require that the final destination of wireless beacon 114 and circuit board 104 be known at the time of manufacture or distribution since its location may be determined without any external intervention after POP display 102 containing the circuit board has been set up in its intended final location.

The above disclosed embodiments may be utilized to optimize embodiments of a manufacturing supply chain associated with POP displays 102 and circuit board 104. As noted above, the location of a given wireless beacon and the other wireless beacons that it may connect to need not be known before the wireless beacon, or circuit board, is installed in its final location. Current commercially available products, however, treat the installation of wireless beacons as a network infrastructure project and do not contemplate integrating wireless beacons into other systems (e.g., POP displays). Thus, for a given store, technicians typically install hard points to supply power and network connectivity for each wireless beacon, which severely limits a store manager's flexibility in placing the beacons. Additionally, once a wireless beacon is deployed in a location, moving the wireless beacon may require bringing in a technician to disconnect and then rewire each wireless beacon in its new location. Location changes must also be accompanied by revisions to the database that describes the placement of each wireless beacon. This mode of deployment is fundamentally incompatible with conventional POP displays (e.g., non-connected POP displays), which typically can be moved around at will. If wireless beacons and their attendant power and networking requirements are installed in POP displays, then the POP displays may become inflexible infrastructure points without a system that allows for flexible movement and locating of the POP displays as described herein.

As described herein, the embodiments of POP display system 100 and POP display 102 with wireless beacon 114 may provide increased flexibility for the placement and movement of the POP displays because of the modular, ad hoc nature of the disclosed embodiments. POP display system 100 may provide a flexible and easy to deploy system that does not require specialized technicians and/or expensive wiring. In certain embodiments, a store manager is able to simply assemble POP display 102 and place the POP display in the store anywhere desired as if it was a conventional display.

Additionally, the disclosed modular POP display system 100 and methods associated with the system simplify the overall supply chain for POP displays. Traditionally, POP displays are manufactured in bulk at a factory and then sent to a distribution center where the displays may remain in storage for months at a time before distribution to a final location. When incorporating wireless beacons, this creates a logistical problem as one would ideally like to know where a given wireless beacon will end up (e.g., so the display can be programmed based on the final location). Current manufacturing supply chains, however, are not structured to accommodate that level of granularity. Typically, large pallets of displays are manufactured, stored, and bulk distributed to stores en masse without regard to a specific display's journey. This method is not a problem when a display simply contains a static display and perhaps a coupon and/or a product holder. For POP displays that interact (e.g., dynamically interact), via wireless beacons, with a customer device so that location, content, and customer specific information may be communicated between the customer device and a remote server, however, such distribution methods are problematic as they require experienced and expensive technicians to install wireless beacon enabled displays at their known final location. Once installed, a human may manually configure each wireless beacon enabled display with its location and identification information, as well as record such information for use in a database. The manual installation, however, may be tedious, time consuming, and difficult to implement on a consistent basis.

Figure 9:
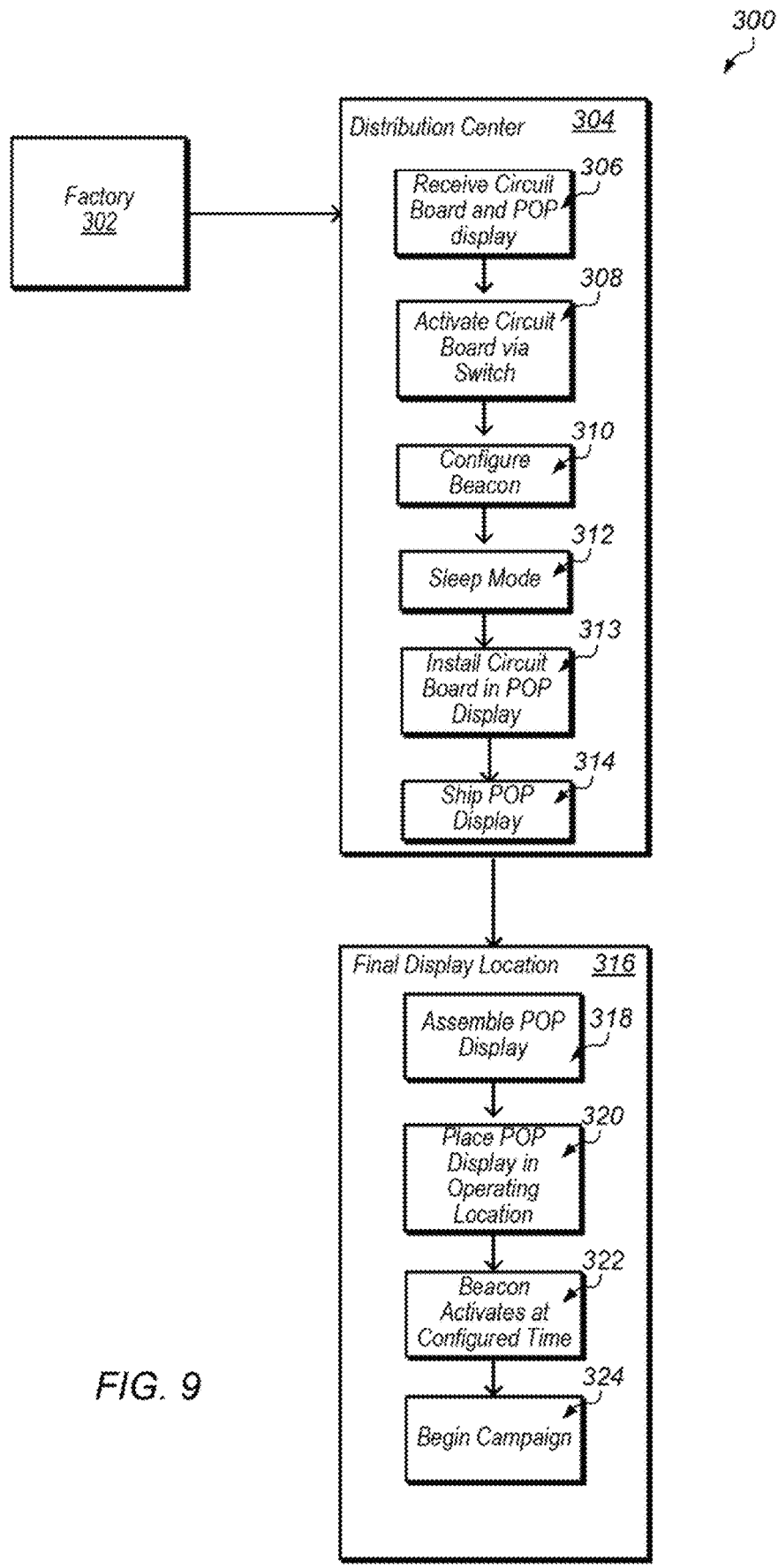
FIG. 9 depicts a flowchart of a manufacturing supply chain associated with POP displays.

FIG. 9 depicts a flowchart of a manufacturing supply chain associated with POP displays 102. Supply chain 300 utilizes embodiments of POP display system 100, POP display 102, and circuit board 104 disclosed herein that via their ad hoc nature, may be flexible and readily compatible with existing manufacturing practices. In certain embodiments, large quantities of POP displays 102 may end up at a final display location without advanced planning and interaction between the POP displays with circuit boards 104, customer devices (e.g., customer devices 118), and a server (e.g., server 126) may provide a configuration to POP system 100 as needed.

In certain embodiments, as shown in FIG. 1, circuit board 104 includes battery 106. In some embodiments, battery 106 is a non-removable battery or a permanently affixed battery. Battery 106 being a non-removable battery may provide power savings in the context of the supply chain 300, shown in FIG. 9. Non-removable batteries may be desirable in supply chain 300 because they are cheaper and are more reliable. For example, it may be more difficult for a permanently affixed battery to be jarred out of its connection as compared to a normal (removable) battery mounted in a typical holder. Additionally, another downside to removable batteries is that they may have to be installed on site by the personnel who set up POP display 102 with circuit board 104 in its final location. Such personnel may fail to install the batteries correctly or even install the batteries at all, rendering POP display 102 useless for its intended purpose.

A consideration in using a non-removable (e.g., permanent) battery as battery 106, as shown in FIG. 1, is that, due to the fact that the battery cannot be replaced, it is important to preserve battery life to maximize the service life of circuit board 104. To increase battery life, in certain embodiments, as shown in FIG. 1, circuit board 104 includes switch 108. Switch 108 may be a switch such as a power jumper or functional equivalent (e.g., a dip switch). Switch 108 may provide a removable connection between battery 106 and the rest of the circuitry in circuit board 104 (e.g., wireless beacon 114). Thus, no power is drained from battery 106 when switch 108 is not installed or turned on. Not installing switch 108 allows circuit board 104 to be stored for extended lengths of time (e.g., approximately one year or greater) without reducing any useable power storage in battery 106.

As shown in FIG. 9, POP display 102 (shown in FIG. 1) is manufactured in factory 302. After manufacture in factory 302, POP display 102 may be moved from the factory to distribution center 304. In certain embodiments, POP display 102 moves from factory 302 to distribution center 304 along with circuit board 104. Circuit board 104 may have battery 106 disconnected from any power draining circuitry (e.g., controller 112 and/or wireless beacon 114). For example, switch 108 may disconnect power to power draining circuitry. At distribution center 304, circuit board 104 (with deactivated circuitry) and POP display 102 are received in 306. At 308, switch 108 is installed or turned on to provide power from battery 106 to the rest of the circuitry in circuit board 104 and wireless beacon 114 is activated. In certain embodiments, wireless beacon 114 is configured such that, upon its first activation, the wireless beacon scans for specific connections that are associated with its configuration mode.

The use of a power switch (e.g., switch 108) in circuit board 104 and supply chain 300 provides several advantages. One advantage is that switch 108 ensures that battery 106 is disconnected at the time of manufacture of POP display 102 to extend the life of the battery. Another advantage is that the wireless beacon 114 is deactivated until switch 108 is connected. Deactivating wireless beacon 114 allows distribution center 304 to activate a small number of POP displays at a time in a configuration procedure discussed below. If, for example, the thousands, or even hundreds of thousands, of POP displays in a warehouse (e.g., distribution center 304) were active at the same time and their wireless beacons were actively broadcasting and/or scanning, the resulting electronic cacophony could render all communication and configuration difficult or even impossible. Empirical testing has shown that having more than 50 active beacons in close proximity may cause severe wireless interference problems. Thus, a distribution center full of active beacons could be rendered completely useless. Furthermore, transportation rules and requirements often restrict the transmission of electromagnetic signals by shipped items. Thus, the ability to disable wireless broadcasts by the included beacons both after initial manufacture and during distribution has the additional benefit of facilitating the transport of embodiments of POP displays 102 with wireless beacons 114.

In some embodiments, it may be desirable to physically activate a battery at the time a circuit board is removed from its shipping container. In such embodiments, an insulator may be placed between battery terminals to turn the controller off. Such an insulator may be tethered to the external shipping enclosure in such a way that the battery insulator is pulled from between the terminals as the circuit board is removed from the shipping enclosure. Removing the battery insulator may then activate the controller and the wireless beacon.

In certain embodiments, after wireless beacon 114 establishes a connection in 308, variations of the wireless beacon's parameters are configured in controller 112 via software in 310. Controller 112 may be configured, for example, via the BLE connection made between wireless beacon 114 and a programmer device (e.g., a wireless programming device). In certain embodiments, wireless beacons 114 are associated with a selected campaign in 310 (e.g., as part of step 802, shown in FIG. 4). During configuration in 310, time parameters may be set in controller 112 such that wireless beacon 114 is able to determine and act upon a target start date of a (selected) campaign. For example, controller 112 and clock 113 may be configured with the current date and time as well as the target date and time for the selected campaign to begin. In certain embodiments, this process is simplified to absolute amount of time between the time of configuration and the beginning of the selected campaign. Various other parameters may be set during the configuration in 310 as well.

In certain embodiments, during configuration 310, unique label 117, shown in FIG. 1, is scanned or otherwise identified. In some embodiments, unique label 117 is added to circuit board 104 before arriving at distribution center 304. In some embodiments, unique label 117 is added at distribution center 304. Scanning unique label 117 may allow the unique label to be associated with wireless beacon 114 and its unique identifier. For example, unique label 117 may be scanned and the unique label may be programmed (via the BLE connection) to be associated with the unique identifier for wireless beacon 114 and/or other associated data such as, but not limited to, an activation date or campaign associated with circuit board 104 and the wireless beacon. Associating unique label 117 with wireless beacon 114 (and its associated data) allows information about the wireless beacon to be accessed while the wireless beacon is asleep by scanning the unique label. Unique label 117 may be scanned while wireless beacon 114 is asleep to obtain programmed information (e.g., campaign information or activation time) and place circuit board 104 into a proper POP display (as described below) before the POP display is shipped to a final display location.

After configuration is complete in 310, the configuration application disconnects from controller 112 and wireless beacon 114 (and circuit board 104) may enter sleep mode 312. In sleep mode 312, wireless beacon 114 may shut down its Bluetooth radio, and the circuitry in circuit board 104 may enter a low power mode to conserve the batteries before the circuit board is installed onto POP display 102 and also while the POP display is stored in advance of being shipped to a final location (e.g., a retail location). Thus, even though switch 108 has been activated in distribution center 304, the problem of having too many active Bluetooth radios (e.g., wireless beacons) in close proximity in the distribution center is inhibited as each activated radio only remains active for a short period of time as configuration of the wireless beacon is conducted. Also, it is worth noting that the low power mode referred to above includes any control circuitry, such as a microcontroller, not just the Bluetooth beacon itself. It will also be apparent to one of ordinary skill in the art that such circuitry may be implemented in various layouts, such as in several discrete chips or one integrated chip.

After circuit board 104 and wireless beacon 114 enter sleep mode 312, the circuit board may be installed in POP display 102 in 313. After circuit board 104 is installed, POP display 102 may be moved (e.g., shipped or transported) in 314. POP display 102 may be moved to final display location 316, as shown in FIG. 9. Final display location 316 may be, for example, a retail or shopping location for POP display 102 to be located in front of customers to provide an interactive customer experience. At final display location 316, POP display 102 may be assembled in 318 and placed in an operating location in 320. After being placed at the operating location in 320, when the configuration circuitry (programmed in 310) determines that the target date and time for the campaign has been reached, the circuitry awakens from its sleep state at the configured time in 322. In 322, wireless beacon 114 activates its wireless (e.g., Bluetooth) radio and campaign related operations begin in 324.

As described above, the embodiment of supply chain 300 may provide a solution to the problem of how to build POP displays with wireless beacons in advance while not running down the batteries while the displays are being stored. Using supply chain 300 may also ensure that the associated radios are inactive while the POP display is being stored and transported. These aspects may be important when considering the overall supply chain.

In some embodiments, POP display 102 includes a light sensor (e.g., one of sensors 116, shown in FIG. 1, is a light sensor). In such embodiments, the light sensor may be used to trigger activation of the radio only after the light sensor detects visible light level above a threshold and the campaign date has started. Using the light sensor to trigger activation may further conserve power by not turning the radio on if POP display 102 has not been unpacked or the store is closed and the lights are off. The radio and some sensors, however, may not need to operate under the same schedule or conditions. For example, certain sensors may be active even when POP display 102 is in low power mode. These sensors may be used to allow POP display 102 to determine whether the display is being transported or being set up at a final location. One skilled in the art will recognize that this permits one to select what a skilled artisan deems to be the optimal tradeoff between battery consumption and situational awareness. Some embodiments may utilize other sensors to determine whether the store is open or whether potential customers are nearby (e.g., proximity sensors may be used to determine if customers are nearby). Information from these sensors may also be combined with the campaign start date to determine whether the radio should be activated. In some embodiments, one of sensors 116 is an accelerometer. The accelerometer may be active when POP display 102 is in low power mode and may trigger activation of the radio when any movement is registered by the accelerometer. If, however, a light sensor does not detect a visible light level above the threshold and/or the campaign date has not started, the activation of the radio may be temporary (e.g., only for a short, selected amount of time).

Figure 10:
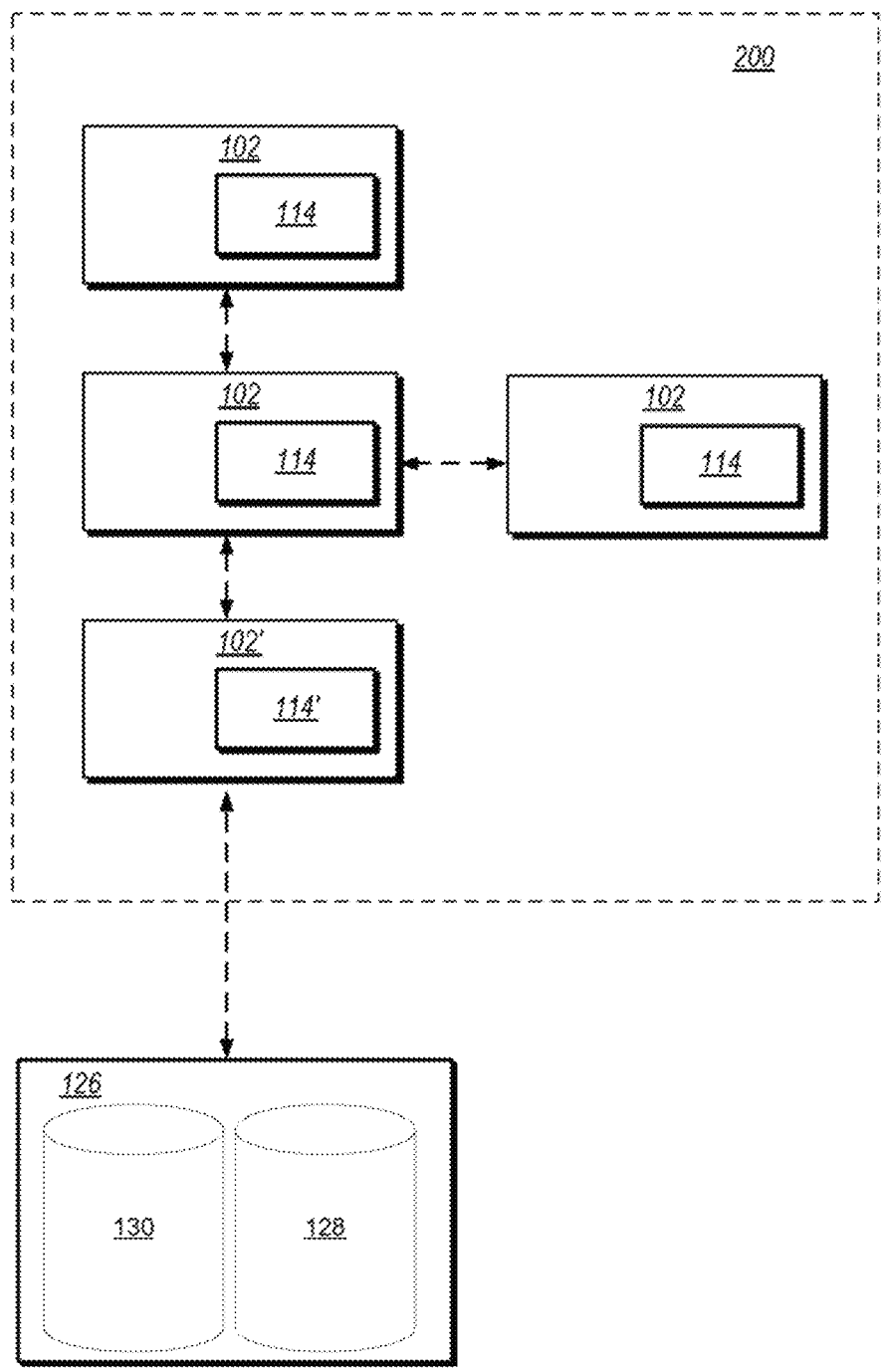
FIG. 10 depicts a block diagram of an embodiment of a plurality of point of purchase displays at a retail location.

In some embodiments, POP display 102 (and POP display system 100) allows for the tracking of the deployment rate of POP displays at a retail location. FIG. 10 depicts a block diagram of an embodiment of a plurality of POP displays 102 at retail location 200. POP displays 102 at retail location 200 are capable of communicating with each other and/or with server 126. In certain embodiments, POP displays 102 communicate with each other and provide information to a single POP display (e.g., POP display 102'). POP display 102' may then communicate with server 126 to provide the information to the server, as shown in FIG. 10.

In some embodiments, server 126 detects information about the relative locations of wireless beacons 114. For example, since each wireless beacon 114 is equipped with a unique identifier, server 126, upon detecting and determining the identity of one wireless beacon 114 in communication range with another wireless beacon, may determine that the beacons are associated with a specific store. In some embodiments, depending on the configured broadcast mode of wireless beacons 114, server 126 may communicate with wireless beacon 114' to relay information to the wireless beacon and other wireless beacons 114 within communication range of wireless beacon 114'. In this way, a group of beacons may operate as an ad hoc distributed communication network, which is advantageous as this does not require that the network be set up and configured beforehand by a technician.

It is known in the industry that, on average, only a fraction of POP displays delivered to a store are actually deployed. In certain embodiments, however, wireless beacon 114 is capable of communicating, whether directly or indirectly, with server 126, as shown in FIGS. 1 and 10. Thus, wireless beacon 114 may relay information gathered by sensors 116 indicating that its POP display has been deployed. For example, if POP display 102 reaches its campaign start time but its light sensor indicates darkness for a prolonged period of time, it may be inferred that the POP display was not deployed on a timely basis.

In some embodiments, data collected from sensors 116 and/or customer device 118 (and/or other sources) that is stored in information 130 on server 126, shown in FIG. 1, may be used for historical analysis of the performance of POP display 102. In some embodiments, the historical analysis data is correlated with saved data from wireless beacon 114 to further gauge customer engagement. For example, combining information about dwell time with the fact of whether the potential customer made a pull request may be used to gauge customer engagement. In some embodiments, the historical data is correlated with third party data (e.g., retailer data such as purchase history, etc.). Correlating the historical data with third party data may provide further information useful to the retailer to enhance a customer's experience.

In some embodiments, various statistical analyses are utilized on historical data collected from POP display 102. Statistical analyses that may be used include, but are not limited to, machine learning and data mining techniques, set theory, multivariate statistics, and time series analyses. Examples of machine learning include deep learning, neural networks, support vector machines, random forests, decision tree learning, association rule learning, inductive logic, clustering, Bayesian networks, reinforcement learning, representation learning, similarity and metric learning, sparse dictionary learning, and genetic algorithms. Examples of data mining, which is often coextensive with machine learning, include spatial data mining, temporal data mining, senor data mining, pattern mining, and subject-based data mining. In some embodiments, these techniques are used for aspects besides historical analysis. For example, smoothing techniques associated with some types of temporal data mining may be used to filter a series of RSSI signal strength values used in bump detection disclosed herein.

Figure 11A:
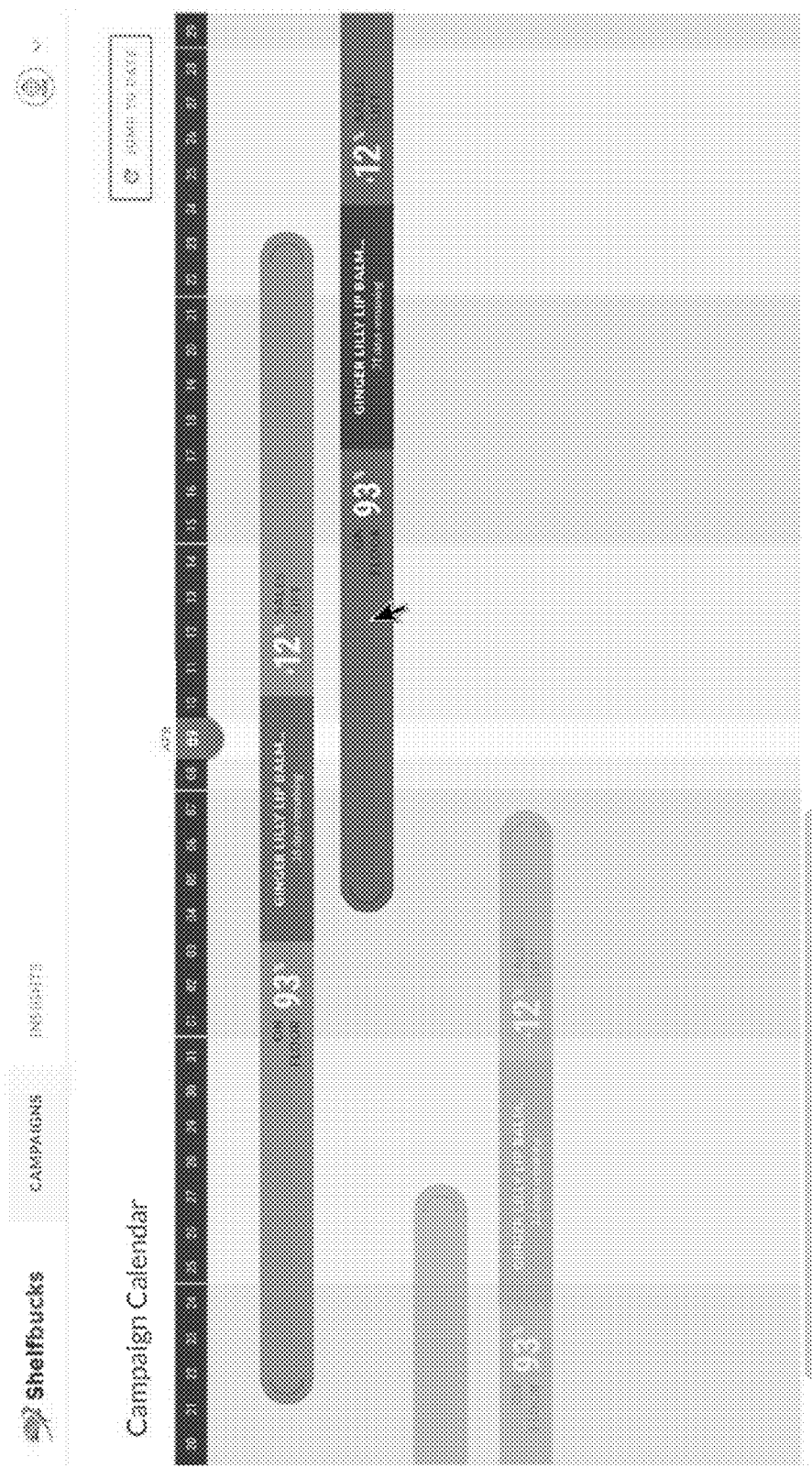
FIG. 11A illustrates an example of a campaign calendar.
Figure 11B:
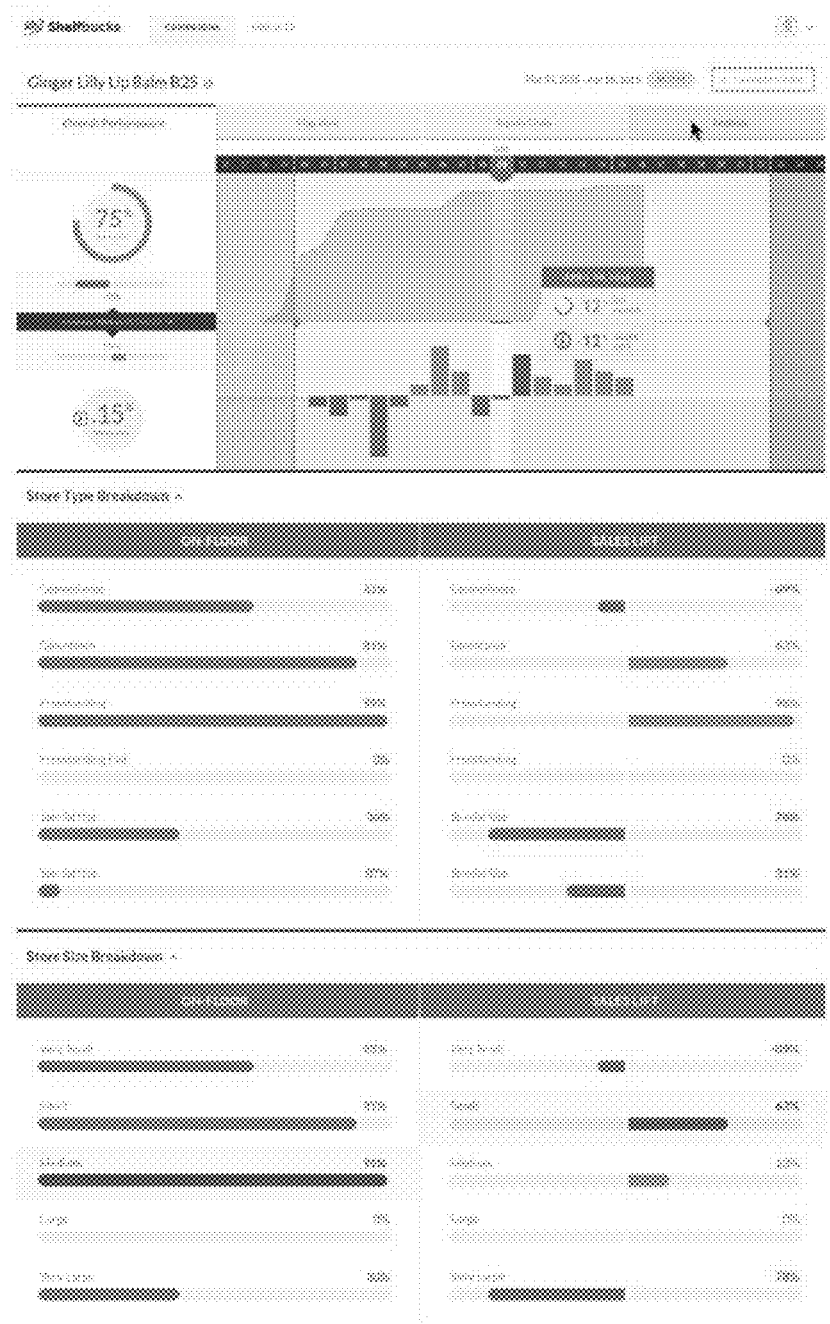
FIG. 11B illustrates an example of an interface displaying various statistics related to POP display deployment and sales.
Figure 11C:
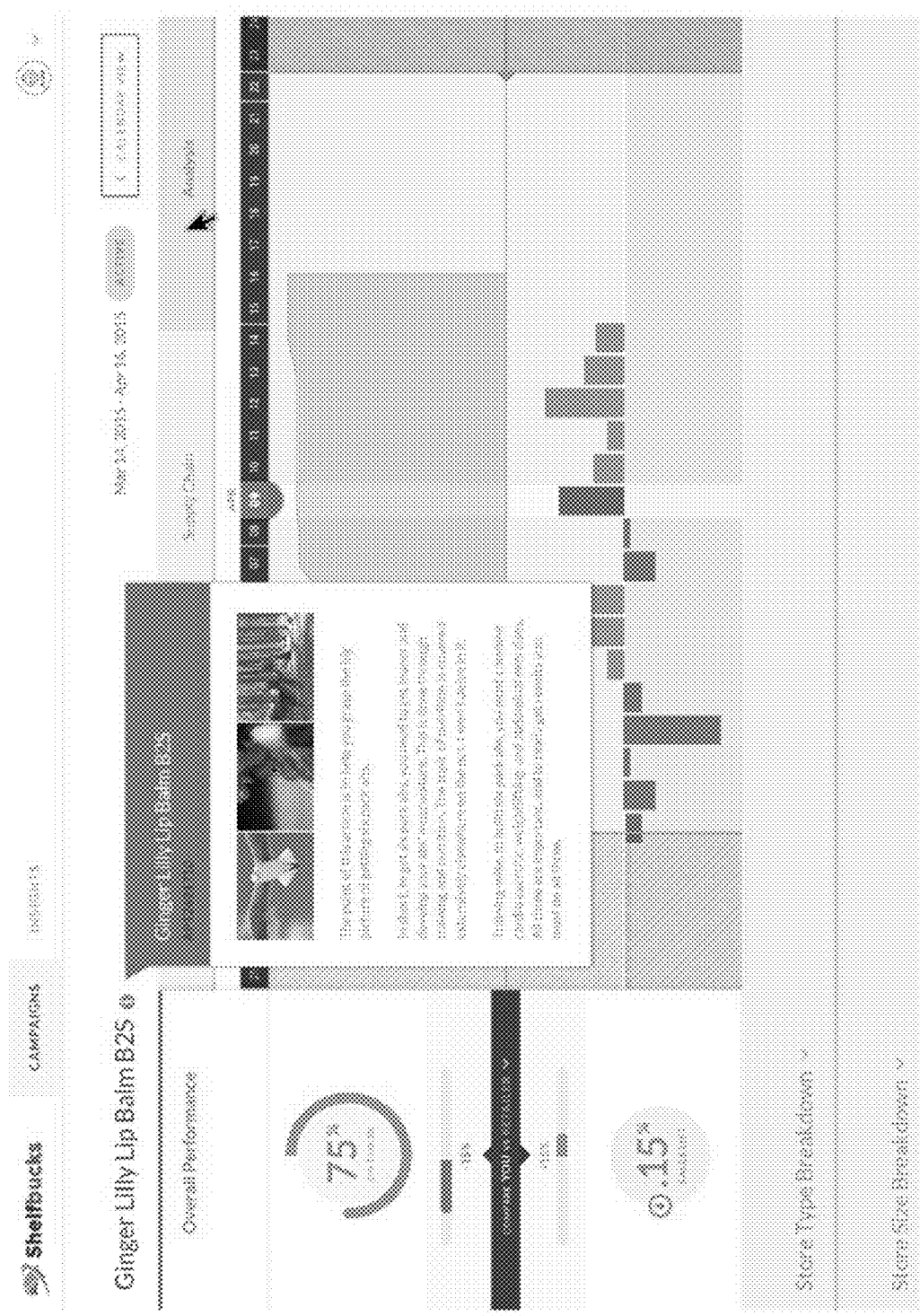
FIG. 11C illustrates an information screen related to the product associated with the POP display.
Figure 11D:
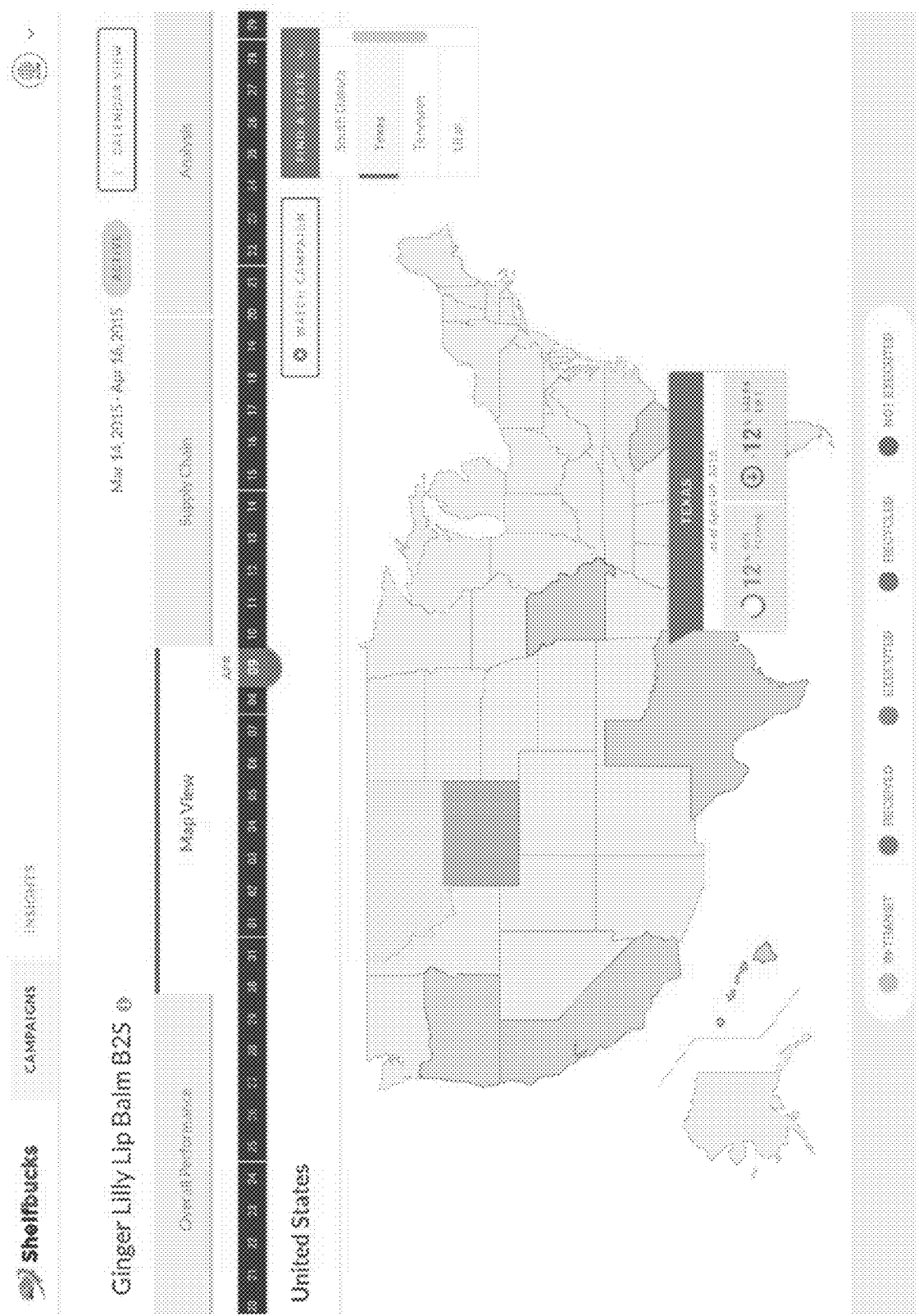
FIG. 11D illustrates an interface displaying national deployment information for POP displays.
Figure 11E:
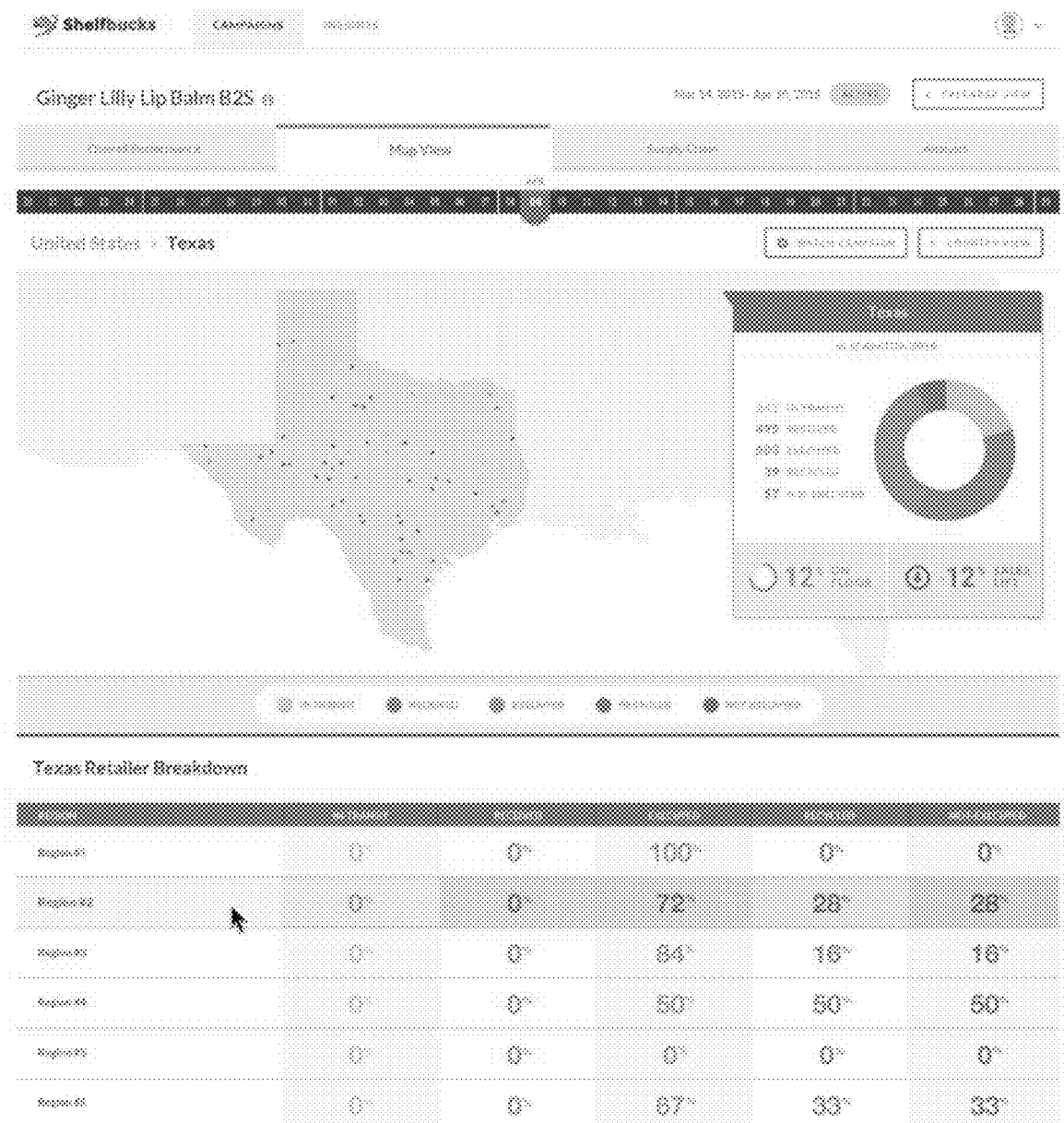
FIG. 11E illustrates an interface displaying state deployment information for POP displays.
Figure 11F:
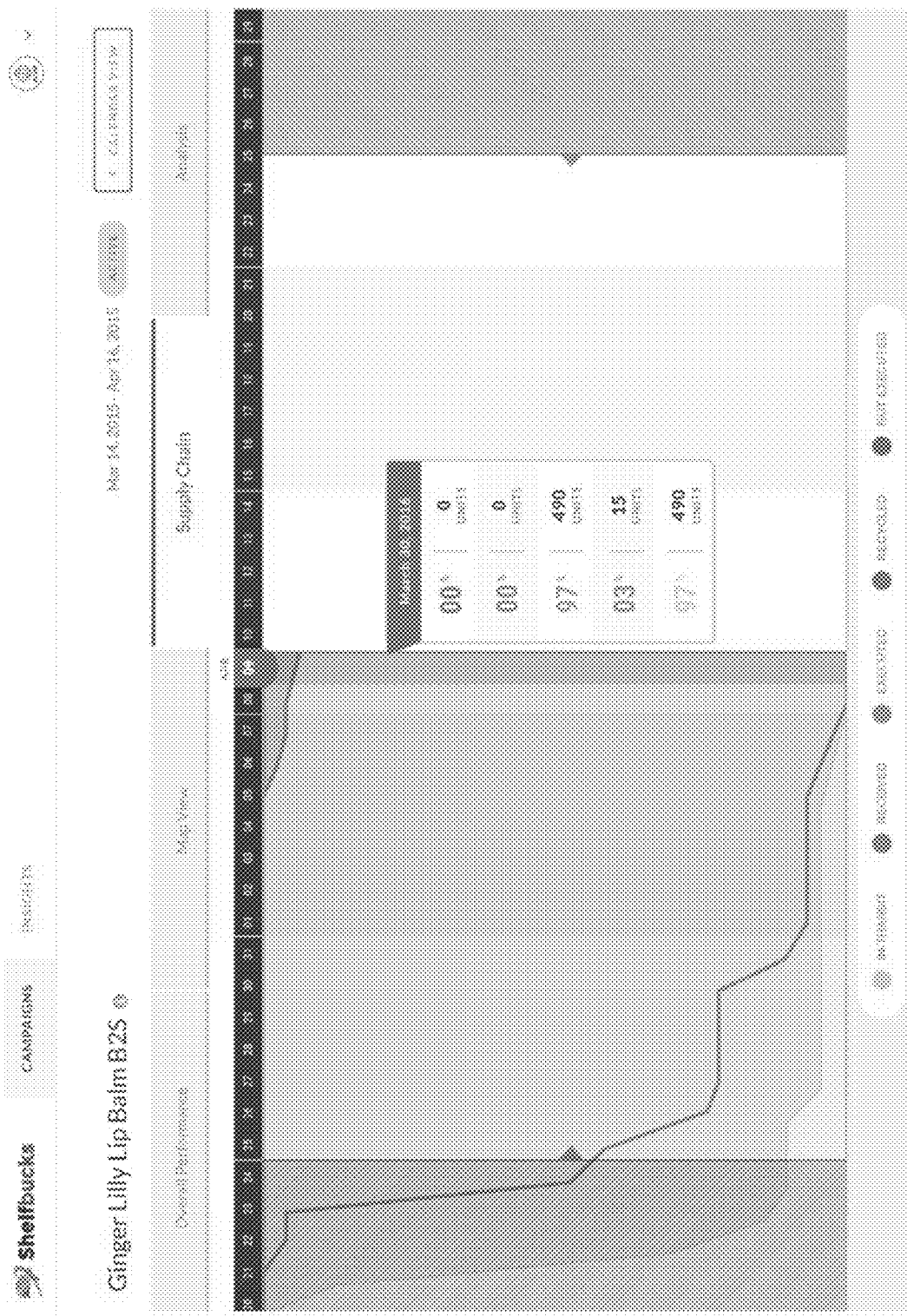
FIG. 11F illustrates an interface displaying supply chain information.
Figure 11G:
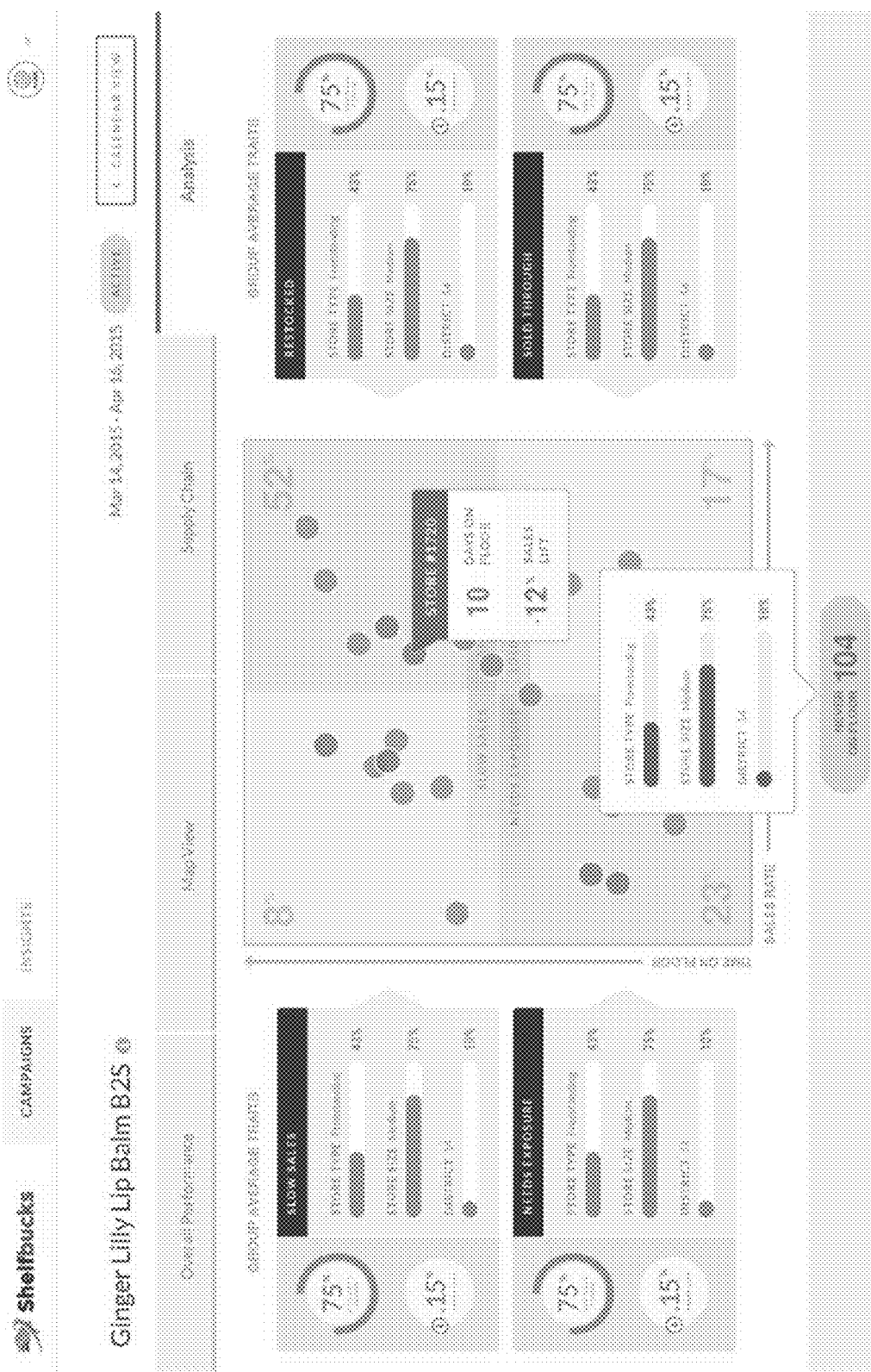
FIG. 11G illustrates an interface displaying a sales analysis associated with the POP display.

Examples of different types of data that may be collected and analyzed for POP displays 102 are illustrated in FIGS. 11A-11G. FIG. 11A illustrates an example of a campaign calendar. FIG. 11B illustrates an example of an interface displaying various statistics related to POP display deployment and sales. FIG. 11C illustrates an information screen related to the product associated with the POP display. FIG. 11D illustrates an interface displaying national deployment information for POP displays. FIG. 11E illustrates an interface displaying state deployment information for POP displays. FIG. 11F illustrates an interface displaying supply chain information. FIG. 11G illustrates an interface displaying a sales analysis associated with the POP display.

In some embodiments, POP display 102 includes components or devices that reduce the surrounding infrastructure requirements for supporting the POP display. Specifically, POP display 102 may be equipped with wireless transmission functionality to transmit any recorded measurements or information derived therein as described above. This information may be transmitted to a network gateway (e.g., network gateway 710, shown in FIG. 2) located within or near the store (e.g., retail location 200, shown in FIG. 2). In certain embodiments, instead of a network gateway, an employee of the retailer or a POP display service provider may be equipped with a mobile device that contains an application adapted to connect to POP display 102 and retrieve data from the point of purchase display to be relayed to a server. This connection may be accomplished utilizing the same wireless connection that is used for beacon functionality, or may be conducted by other standard wireless transmission protocols as described herein, e.g., IEEE 802.11. This minimizes the need for wireless transmission infrastructure to support the retrieval of information collected by the point of purchase displays.

In some embodiments, POP display system 100 utilizes the application already installed on a potential customer's mobile device (e.g., software package 122 on customer device 118) to relay the collected information to a server (e.g., server 126). As shown in FIG. 1, POP display 102 may connect with customer device 118 via the same wireless connection that enables beacon functionality (e.g., Bluetooth connection between wireless beacon 114 and wireless transceiver 120A) and deliver the data to the customer device. Customer device 118 may then transmit the data to server 126 via wireless transceiver 120B or another wireless transceiver. Since transmission through customer device 118 may incur a data charge on the customer, the application may be configured to prompt the user for permission to do so. In some embodiments, the application may offer the user some form of compensation for the use of their data connection. For example, a discount on some good or service in the store. In this way, data can be moved to server 126 by users who are normally just walking around the store and requires no special infrastructure. Additionally, the data to be transmitted may be compressed using standard techniques to minimize the amount of bandwidth consumed, and the application (e.g., the SDK) may be configured to, under certain cases, delay the transfer of data over the mobile device's wireless network connection to the server if the network connection is not over Wi-Fi and/or the mobile device is not connected to an external power source. In other words, the mobile device may be directed to save the data and wait until the customer is connected to a wireless network where transmission of the data will not adversely impact the customer's wireless data plan or the mobile device's battery life.

In certain embodiments, one or more process steps described herein may be performed by one or more processors (e.g., a computer processor) executing instructions stored on a non-transitory computer-readable medium. For example, communication between POP display 102, customer device 118, server 126, and/or network gateway 710, shown in FIG. 1, may have one or more steps performed by one or more processors executing instructions stored as program instructions in a computer readable storage medium (e.g., a non-transitory computer readable storage medium). In certain embodiments, controller 112, on POP display 102, software package 125, on customer device 118, server 126, and/or network gateway 710 include program instructions in the computer readable storage medium.

Figure 12:
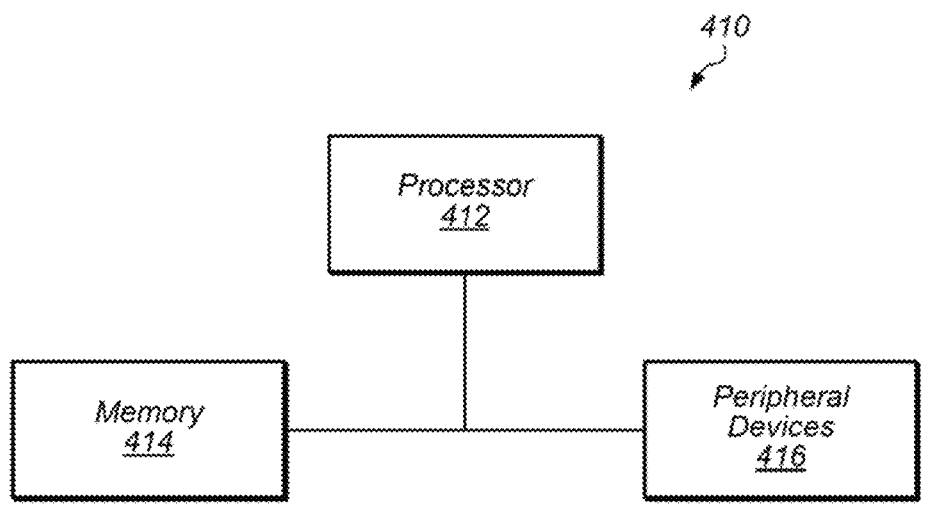
FIG. 12 depicts a block diagram of one embodiment of an exemplary computer system.

FIG. 12 depicts a block diagram of one embodiment of exemplary computer system 410. Exemplary computer system 410 may be used to implement one or more embodiments described herein. In some embodiments, computer system 410 is operable by a user to implement one or more embodiments described herein such as communication between POP display 102, customer device 118, server 126, and/or network gateway 710, shown in FIG. 1. In the embodiment of FIG. 12, computer system 410 includes processor 412, memory 414, and various peripheral devices 416. Processor 412 is coupled to memory 414 and peripheral devices 416. Processor 412 is configured to execute instructions, including the instructions for communication between POP display 102, customer device 118, server 126, and/or network gateway 710, which may be in software. In various embodiments, processor 412 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, computer system 410 may include more than one processor. Moreover, processor 412 may include one or more processors or one or more processor cores.

Processor 412 may be coupled to memory 414 and peripheral devices 416 in any desired fashion. For example, in some embodiments, processor 412 may be coupled to memory 414 and/or peripheral devices 416 via various interconnect. Alternatively or in addition, one or more bridge chips may be used to coupled processor 412, memory 414, and peripheral devices 416.

Memory 414 may comprise any type of memory system. For example, memory 414 may comprise DRAM, and more particularly double data rate (DDR) SDRAM, RDRAM, etc. A memory controller may be included to interface to memory 414, and/or processor 412 may include a memory controller. Memory 414 may store the instructions to be executed by processor 412 during use, data to be operated upon by the processor during use, etc.

Figure 13:
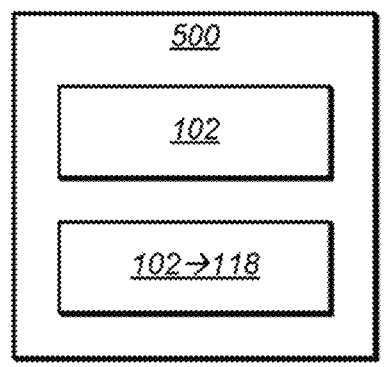
FIG. 13 depicts a block diagram of one embodiment of a computer accessible storage medium.

Peripheral devices 416 may represent any sort of hardware devices that may be included in computer system 410 or coupled thereto (e.g., storage devices, optionally including computer accessible storage medium 500, shown in FIG. 13, other input/output (I/O) devices such as video hardware, audio hardware, user interface devices, networking hardware, etc.).

Turning now to FIG. 13, a block diagram of one embodiment of computer accessible storage medium 500 including one or more data structures representative of POP display 102 (depicted in FIG. 1) and/or memory cache 124 (depicted in FIG. 1) included in an integrated circuit design and one or more code sequences representative of communication between POP display 102, customer device 118, server 126, and/or network gateway 710 (shown in FIGS. 1 and 2). Each code sequence may include one or more instructions, which when executed by a processor in a computer, implement the operations described for the corresponding code sequence. Generally speaking, a computer accessible storage medium may include any storage media accessible by a computer during use to provide instructions and/or data to the computer. For example, a computer accessible storage medium may include non-transitory storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, computer accessible storage medium 500 may store data in a non-transitory manner, where non-transitory in this context may refer to not transmitting the instructions/data on a signal. For example, non-transitory storage may be volatile (and may lose the stored instructions/data in response to a power down) or non-volatile.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs (field programmable gate arrays).

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

The invention claimed is:

1. A point of purchase (POP) display system, comprising:
    a plurality of POP displays located at a selected retail location, wherein:
        the POP displays are associated with a selected campaign,
        the POP displays have been randomly distributed from a temporary storage location to the selected retail location;
    a plurality of wireless beacons coupled to a respective POP display of the plurality of POP displays, wherein:
        a respective wireless beacon is associated with a respective unique identifier of the respective POP display,
        the respective wireless beacon includes a beacon radio that transmits a respective plurality of data packets that include the respective unique identifier of the respective POP display in a respective wireless signal of radio frequency (RF) waves,
        the respective wireless beacon is installed on the respective POP display, and
        the respective POP display has a respective location that is initially an unknown location within the selected retail location; and
    a plurality of wireless network gateways located at the selected retail location with a respective known location within the selected retail location, wherein a respective wireless network gateway of the plurality of wireless network gateways comprises a processor, a memory coupled to the processor that stores instructions and, and one or more wireless antennas coupled to the processor, wherein execution of the instructions by the processor configures the respective wireless network gateway to implement functions to:
        receive the respective plurality of data packets that include the respective unique identifier of the respective POP display in the respective wireless signal through at least one wireless antenna from the respective wireless beacon; and
        assess a respective signal strength of the respective wireless signal of the respective wireless beacon to the respective wireless network gateway based on the respective plurality of data packets; and
    wherein execution of the instructions by the processor configures one or more of the plurality of wireless network gateways to:
    associate or cause a remote server to associate the respective unique identifier of the respective POP display with the selected retail location of the plurality of wireless network gateways known to the remote server in response to receiving the respective unique identifier of the respective POP display from the one or more wireless network gateways;
    in response to associating the respective unique identifier of the respective POP display with the selected retail location, determine or cause the remote server to determine a respective distance between the respective POP display and each of the plurality of wireless network gateways based on the assessed respective signal strength between each of the plurality of wireless network gateways and the respective wireless beacon installed on the respective POP display; and
    in response to determining or causing the remote server determine the respective distance, calculate or cause the remote server to calculate the respective location to change the initially unknown location of the respective POP display to a known position within the selected retail location based on: (i) the respective known location of each of the wireless network gateways, and (ii) the respective distance between the respective wireless beacon installed on the respective POP display and each of the plurality of wireless network gateways.

2. The POP display system of claim 1, wherein the assessed respective signal strength comprises a Received Signal Strength Indication (RSSI) value of the respective wireless signal.

3. The POP display system of claim 1, wherein execution of the instructions by the processor configures the one or more wireless network gateways to calculate the respective location of the respective POP display to change the initially unknown location of the respective POP display to the known position within the selected retail location.

4. The POP display system of claim 1, further comprising the remote server, wherein execution of the instructions by the processor configures the one or more wireless network gateways to:
transmit the respective unique identifier, the assessed respective signal strength, and a respective gateway identifier of the respective wireless network gateway to the remote server in response to receiving the respective plurality of data packets that include the respective unique identifier;
in response to transmitting the respective unique identifier and the assessed respective signal strength to the remote server, receive, from the remote server, the calculation of the respective location of the respective POP display.

5. The POP display system of claim 4, wherein:
the remote server stores the respective known location of the respective wireless network gateway, and
the remote server associates the respective unique identifier of the respective POP display with the selected retail location of the plurality of wireless network gateways in response to receiving the respective unique identifier of the respective POP display from the one or more wireless network gateways.

6. The POP display system of claim 4, wherein the one or more network gateways transmit the respective unique identifier and the assessed respective signal strength to the remote server over a second communication network that is different from a first communication network of the wireless signal.

7. The POP display system of claim 4, further comprising a mobile device including a software package installed thereon, wherein:
the one or more wireless network gateways transmit the respective unique identifier and the assessed respective signal strength to the remote server through the software package installed on a mobile device,
the software package comprises a mobile application and a software developer kit (SDK) that interprets the respective plurality of data packets received by the mobile device, and
the respective unique identifier and the assessed respective signal strength are provided to the mobile device in a wireless data packet broadcast by the one or more wireless network gateways.

8. The POP display system of claim 1, wherein:
the beacon radio of the respective wireless beacon includes a beacon sub-gigahertz radio;
the respective wireless beacon transmits the respective plurality of data packets, via the beacon sub-gigahertz radio, by broadcasting the respective wireless signal below a 1 GHz frequency band;
the respective wireless network gateway includes a gateway sub-gigahertz radio;
execution of the instructions by the processor configures the respective wireless network gateway to implement functions to:
receive, via the gateway sub-gigahertz radio, the respective plurality of data packets in the respective wireless signal below the 1 GHz frequency band from the respective wireless beacon.

9. The POP display system of claim 1, wherein:
the beacon radio of the respective wireless beacon includes a beacon above one-GHz beacon radio;
the respective wireless beacon transmits the respective plurality of data packets, via the beacon above one-GHz beacon radio, by broadcasting the respective wireless signal above a 1 GHz frequency band;
the respective wireless network gateway includes a gateway above one-GHz gateway radio;
execution of the instructions by the processor configures the respective wireless network gateway to implement functions to:
receive, via the gateway above one-GHz gateway radio, the respective plurality of data packets in the respective wireless signal above the 1 GHz frequency band with frequency hopping from the respective wireless beacon.

10. The POP display system of claim 1, wherein the function to calculate or cause the remote server to calculate to change initially unknown location of the respective POP display to the known position includes to:
triangulate the respective location of the respective POP display within the selected retail location based on: (i) the respective known location of each of the wireless network gateways, and (ii) the respective distance between the respective wireless beacon and each of the wireless network gateways.

11. The POP display system of claim 1, further comprising the remote server, wherein:
execution of the instructions by the processor configures the one or more of the plurality of wireless network gateways to transmit, to the remote server: (i) the assessed respective signal strength between each of the plurality of wireless network gateways and the respective wireless beacon installed on the respective POP display, (ii) the respective unique identifier of the respective POP display, and (iii) a respective gateway identifier of each of the plurality of wireless network gateways; and
in response to receiving the transmission from the one or more of the plurality of wireless network gateways, the remote server:
retrieves the respective known location associated with the respective gateway identifier of each of the plurality wireless network gateways,
determines the respective distance between the respective POP display and each of the plurality of wireless network gateways based on the assessed respective signal strength between each of the plurality of wireless network gateways and the respective wireless beacon installed on the respective POP display,
calculates the respective location to change the initially unknown location of the respective wireless beacon and the respective POP display to the known position within the selected retail location based on: (i) the retrieved respective known location of each of the wireless network gateways, and (ii) the respective distance between the respective wireless beacon installed on the respective POP display and each of the plurality of wireless network gateways.

* * * * *